(12) United States Patent
Lee

(10) Patent No.: US 11,825,085 B2
(45) Date of Patent: *Nov. 21, 2023

(54) METHOD FOR ENCODING/DECODING IMAGE SIGNAL AND DEVICE THEREFOR

(71) Applicant: GUANGDONG OPPO MOBILE TELECOMMUNICATIONS CORP., LTD., Guangdong (CN)

(72) Inventor: Bae Keun Lee, Seongnam-si (KR)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/806,449

(22) Filed: Jun. 10, 2022

(65) Prior Publication Data

US 2022/0303531 A1 Sep. 22, 2022

Related U.S. Application Data

(63) Continuation of application No. 17/245,409, filed on Apr. 30, 2021, now Pat. No. 11,405,613, which is a (Continued)

(30) Foreign Application Priority Data

Nov. 8, 2018 (KR) .................. 10-2018-0136249
Nov. 8, 2018 (KR) .................. 10-2018-0136306

(51) Int. Cl.
*H04N 19/119* (2014.01)
*H04N 19/132* (2014.01)
(Continued)

(52) U.S. Cl.
CPC ........ *H04N 19/119* (2014.11); *H04N 19/132* (2014.11); *H04N 19/137* (2014.11); *H04N 19/176* (2014.11)

(58) Field of Classification Search
CPC .. H04N 19/119; H04N 19/132; H04N 19/137; H04N 19/176
See application file for complete search history.

(56) References Cited

U.S. PATENT DOCUMENTS 9,621,888 B2 4/2017 Jeon
10,116,941 B2 10/2018 Jeon et al.
(Continued)

FOREIGN PATENT DOCUMENTS

CN 108293111 A 7/2018
CN 108353166 A 7/2018
(Continued)

OTHER PUBLICATIONS

International Search Report in the international application No. PCT/KR2019/015200, dated Feb. 14, 2020.
(Continued)

*Primary Examiner* — Hesham K Abouzahra
(74) *Attorney, Agent, or Firm* — PERKINS COIE LLP

(57) ABSTRACT

An image decoding method according to the present invention may comprise the steps of: dividing a coding block into a first prediction unit and a second prediction unit; deriving a merge candidate list for the coding block; deriving first motion information for the first prediction unit and second motion information for the second prediction unit by means of the merge candidate list; and on the basis of the first motion information and the second motion information, acquiring a prediction sample within the coding block.

28 Claims, 13 Drawing Sheets

Related U.S. Application Data continuation of application No. PCT/KR2019/015200, filed on Nov. 8, 2019.

(51) Int. Cl.
   *H04N 19/137*   (2014.01)
   *H04N 19/176*   (2014.01)

(56) References Cited

U.S. PATENT DOCUMENTS

| | | | |
|---|---|---|---|
| 10,200,711 | B2 | 2/2019 | Li et al. |
| 2013/0114717 | A1 | 5/2013 | Zheng et al. |
| 2013/0202038 | A1 | 8/2013 | Seregin et al. |
| 2014/0301461 | A1 | 10/2014 | Jeon |
| 2016/0286229 | A1 | 9/2016 | Li et al. |
| 2017/0214922 | A1 | 7/2017 | Jeon et al. |
| 2018/0103264 | A1 | 4/2018 | Sugio |
| 2018/0199054 | A1* | 7/2018 | Hsu ................ H04N 19/176 |
| 2018/0199058 | A1 | 7/2018 | Lee et al. |
| 2019/0068978 | A1 | 2/2019 | Jeon et al. |
| 2019/0246133 | A1 | 8/2019 | Lee |
| 2019/0364284 | A1 | 11/2019 | Moon et al. |
| 2021/0006790 | A1 | 1/2021 | Zhang et al. |
| 2021/0120242 | A1 | 4/2021 | Nam et al. |
| 2021/0352280 | A1* | 11/2021 | Kang ................ H04N 19/105 |

FOREIGN PATENT DOCUMENTS

| | | |
|---|---|---|
| JP | 2022506162 A | 1/2022 |
| KR | 20170131448 A | 11/2017 |
| KR | 20180005121 A | 1/2018 |
| KR | 20180065897 A | 6/2018 |
| KR | 20180084659 A | 7/2018 |
| RU | 2577779 C2 | 3/2016 |
| RU | 2617920 C9 | 8/2017 |
| WO | 2019235893 A1 | 12/2019 |

OTHER PUBLICATIONS

Oudin S et al, "Block merging for quadtree-based video coding", Multimedia and Expo (ICME), 2011 IEEE International Conference on, IEEE, Jul. 11, 2011 (Jul. 11, 2011), pp. 1-6, XP031964689.
Benjamin Bross et al, "Versatile Video Coding (Draft 2)", Document: JVET-K 1001-v7, 11th Meeting: Ljubljana, SI, Jul. 10-18, 2018, XP030266648. 147 pages.
R-L Liao (Panasonic) et al, "CE10.3.1.b: Triangular prediction unit mode", Document: JVET-L0124-v2, 12th Meeting: Macao, CN, Oct. 3-12, 2018, XP030198593. 8 pages.
Supplementary European Search Report in the European application No. 19883291.7, dated Nov. 10, 2021. 10 pages.
First Office Action of the European application No. 19883291.7, dated May 11, 2022. 7 pages.
Written Opinion of the International Search Authority in the international application No. PCT/KR2019/015200, dated Feb. 14, 2020. 11 pages.
First Office Action of the Canadian application No. 3118883, dated Jun. 1, 2022. 7 pages.
First Office Action of the U.S. Appl. No. 17/245,409, dated Aug. 5, 2021.
Second Office Action of the U.S. Appl. No. 17/245,409, dated Dec. 8, 2021.
Notice of Allowance of the U.S. Appl. No. 17/245,409, dated Mar. 17, 2022.
Supplemental Notice of Allowance of the U.S. Appl. No. 17/245,409, dated May 16, 2022.
Ahn, Y. et al. "CE10-related: Diagonal motion partitions on top of MTT block structure" JVET of ITU-T SG 16 WP 3 and ISO/IEC JTC 1/SC 29/WG 11 11th Meeting: Ljubljana, SI, Jul. 10-18, 2018, [JVET-K0270], JVET-K0270 (version 3). 9 pages.
Yan, Ning et al., Diagonal motion partitions for inter prediction in HEVC, 2016 Visual Communications and Image Processing (VCIP), IEEE, Jan. 5, 2017, pp. 1-4.
First Office Action of the Japanese application No. 2021-523491, dated Aug. 2, 2022. 12 pages with English translation.
Office Action of the Indian application No. 202117022043, dated Aug. 2, 2022. 6 pages with English translation.
First Office Action of the Chinese application No. 202110698068.1, dated Nov. 16, 2022. 18 pages with English translation.
Notice of Oral Examination of the European application No. 19883291.7, dated Nov. 21, 2022. 10 pages.
Second Office Action of the Japanese application No. 2021-523491, dated Feb. 17, 2023. 8 pages with English translation.
Max Blaser et al., "Description of SDR and 360° video coding technology proposal by RWTH Aachen University", Joint Video Experts Team (JVET) of ITU-T SG 16 WP 3 and ISO/IEC JTC 1/SC29/WG 11, JVET-J0023-v1, 10th Meeting: San Diego, Apr. 10-20, 2018. 101 pages.
First Office Action of the Russian application No. 2021116404, dated Apr. 11, 2023. 12 pages with English translation.
Second Office Action of the Canadian application No. 3118883, dated Feb. 14, 2023. 5 pages.
First Office Action of the Malaysian application No. PI2021002420, dated Jul. 24, 2023. 4 pages.
First Office Action of the Israeli application No. 282874, dated Aug. 1, 2023. 5 pages.
Decision of Rejection of the Japanese application No. 2021-523491, dated Aug. 15, 2023. 6 pages with English translation.
Notice of Allowance of the Russian application No. 2021116404, dated Aug. 21, 2023. 20 pages with English translation.
First Office Action of the Indonesian application No. P00202104259, dated Aug. 28, 2023. 3 pages with English translation.
Notice of Allowance of the U.S. Appl. No. 17/806,456, dated Sep. 15, 2023. 11 pages.

* cited by examiner

METHOD FOR ENCODING/DECODING IMAGE SIGNAL AND DEVICE THEREFOR

CROSS REFERENCE TO RELATED APPLICATION

This is a continuation of U.S. application Ser. No. 17/245,409, filed on Apr. 30, 2021, which is a continuation of International Application No. PCT/KR2019/015200, filed on Nov. 8, 2019, and entitled "METHOD FOR ENCODING/DECODING IMAGE SIGNAL AND DEVICE THEREFOR", which is based on and claims priorities of Korean Application No. 10-2018-0136249, filed on Nov. 8, 2018 and Korean Application No. 10-2018-0136306, filed on Nov. 8, 2018. The disclosure of the above applications is hereby incorporated by reference in their entireties.

TECHNICAL FIELD

The present disclosure relates to a video signal encoding and decoding method and an apparatus therefor.

BACKGROUND

As display panels are getting bigger and bigger, video services of further higher quality are required more and more. The biggest problem of high-definition video services is significant increase in data volume, and to solve this problem, studies for improving the video compression rate are actively conducted. As a representative example, the Motion Picture Experts Group (MPEG) and the Video Coding Experts Group (VCEG) under the International Telecommunication Union-Telecommunication (ITU-T) have formed the Joint Collaborative Team on Video Coding (JCT-VC) in 2009. The JCT-VC has proposed High Efficiency Video Coding (HEVC), which is a video compression standard having a compression performance about twice as high as the compression performance of H.264/AVC, and it is approved as a standard on Jan. 25, 2013. With rapid advancement in the high-definition video services, performance of the HEVC gradually reveals its limitations.

SUMMARY

An object of the present disclosure is to provide a method of applying partitioning to a coding block to obtain a plurality of prediction blocks in encoding/decoding a video signal, and an apparatus for performing the method.

Another object of the present disclosure is to provide a method of deriving motion information of each of a plurality of prediction blocks, in encoding/decoding a video signal.

Another object of the present disclosure is to provide a method of deriving a merge candidate using an inter-region motion information list, in encoding/decoding a video signal.

The technical problems to be achieved in the present disclosure are not limited to the technical problems mentioned above, and unmentioned other problems may be clearly understood by those skilled in the art from the following description.

A method of decoding/encoding a video signal according to the present disclosure may include the steps of: applying partitioning to a coding block to obtain a first prediction unit and a second prediction unit; deriving a merge candidate list for the coding block; deriving first motion information for the first prediction unit and second motion information for the second prediction unit using the merge candidate list; and obtaining a prediction sample in the coding block based on the first motion information and the second motion information. At this point, whether or not to apply partitioning to the coding block is determined based on a size of the coding block, and the first motion information for the first prediction unit is derived from a first merge candidate in the merge candidate list, and the second motion information for the second prediction unit is derived from a second merge candidate different from the first merge candidate.

In the video signal encoding and decoding method according to the present disclosure, when at least one among a width and a height of the coding block is greater than a threshold value, partitioning of the coding block may not be not allowed.

In the video signal encoding and decoding method according to the present disclosure, the method may further include the step of decoding first index information for specifying the first merge candidate and second index information for specifying the second merge candidate from a bitstream, and when a value of the second index information is equal to or greater than a value of the first index information, the value of the second index information specifying the second merge candidate is obtained by adding 1 to the value of the first index information specifying the first merge candidate.

In the video signal encoding and decoding method according to the present disclosure, when the prediction sample is included in a boundary region between the first prediction unit and the second prediction unit, the prediction sample may be derived based on a weighted sum operation of a first prediction sample derived based on the first motion information and a second predicted sample derived based on the second motion information.

In the video signal encoding and decoding method according to the present disclosure, a first weighting value applied to the first prediction sample may be determined based on an x-axis coordinate and a y-axis coordinate of the prediction sample.

In the video signal encoding and decoding method according to the present disclosure, a second weighting value applied to the second prediction sample may be derived by subtracting the first weighting value from a constant value.

In the video signal encoding and decoding method according to the present disclosure, the maximum number of merge candidates that the merge candidate list may include may be determined based on whether the coding block is partitioned into the first prediction unit and the second prediction unit.

Features briefly summarized above with respect to the present disclosure are merely exemplary aspects of the detailed description of the present disclosure that will be described below, and do not limit the scope of the present disclosure.

According to the present disclosure, inter prediction efficiency can be improved by providing a method of applying partitioning to a coding block to obtain a plurality of prediction blocks, and deriving motion information of each of the prediction blocks.

According to the present disclosure, inter prediction efficiency can be improved by providing a method of deriving a merge candidate using an inter-region motion information list.

The effects that can be obtained from the present disclosure are not limited to the effects mentioned above, and unmentioned other effects may be clearly understood by those skilled in the art from the following description.

DETAILED DESCRIPTION

Hereafter, an embodiment of the present disclosure will be described in detail with reference to the accompanying drawings.

Encoding and decoding of a video is performed by the unit of block. For example, an encoding/decoding process such as transform, quantization, prediction, in-loop filtering, reconstruction or the like may be performed on a coding block, a transform block, or a prediction block.

Hereinafter, a block to be encoded/decoded will be referred to as a 'current block'. For example, the current block may represent a coding block, a transform block or a prediction block according to a current encoding/decoding process step.

In addition, it may be understood that the term 'unit' used in this specification indicates a basic unit for performing a specific encoding/decoding process, and the term 'block' indicates a sample array of a predetermined size. Unless otherwise stated, the 'block' and 'unit' may be used to have the same meaning. For example, in an embodiment described below, it may be understood that a coding block and a coding unit have the same meaning.

Figure 1:
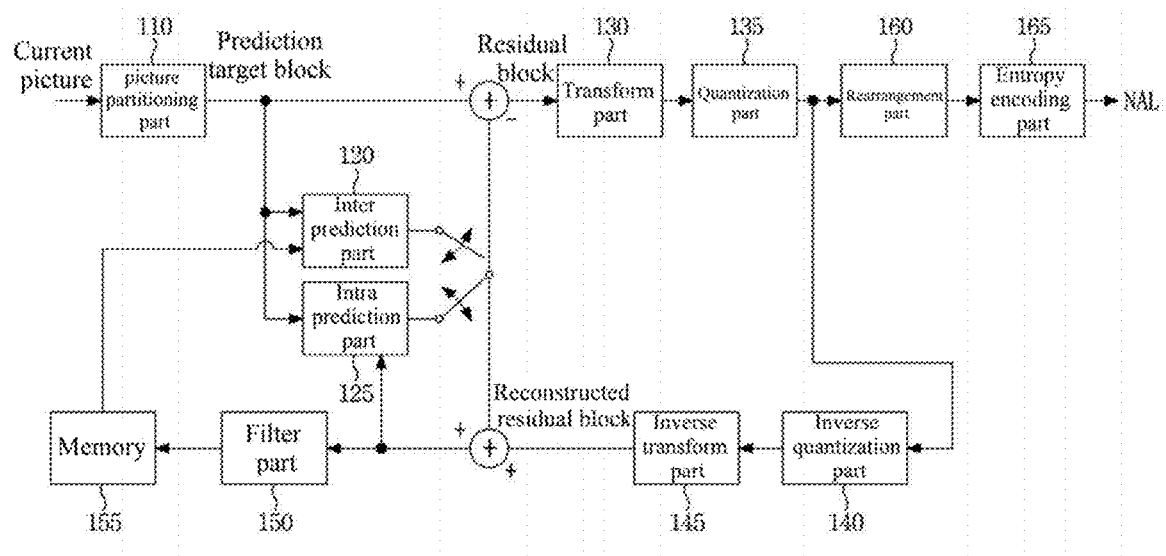
FIG. 1 is a block diagram showing a video encoder according to an embodiment of the present disclosure.

FIG. 1 is a block diagram showing a video encoder according to an embodiment of the present disclosure.

Referring to FIG. 1, a video encoding apparatus 100 may include a picture partitioning part 110, a prediction part 120 and 125, a transform part 130, a quantization part 135, a rearrangement part 160, an entropy coding part 165, an inverse quantization part 140, an inverse transform part 145, a filter part 150, and a memory 155.

Each of the components shown in FIG. 1 is independently shown to represent characteristic functions different from each other in a video encoding apparatus, and it does not mean that each component is formed by the configuration unit of separate hardware or single software. That is, each component is included to be listed as a component for convenience of explanation, and at least two of the components may be combined to form a single component, or one component may be divided into a plurality of components to perform a function. Integrated embodiments and separate embodiments of the components are also included in the scope of the present disclosure if they do not depart from the essence of the present disclosure.

In addition, some of the components are not essential components that perform essential functions in the present disclosure, but may be optional components only for improving performance. The present disclosure can be implemented by including only components essential to implement the essence of the present disclosure excluding components used for improving performance, and a structure including only the essential components excluding the optional components used for improving performance is also included in the scope of the present disclosure.

The picture partitioning part 110 may apply partitioning to an input picture to obtain at least one processing unit. At this point, the processing unit may be a prediction unit (PU), a transform unit (TU), or a coding unit (CU). The picture partitioning part 110 may apply partitioning to a picture to obtain a combination of a plurality of coding units, prediction units, and transform units, and encode a picture by selecting a combination of a coding unit, a prediction unit, and a transform unit based on a predetermined criterion (e.g., a cost function).

For example, one picture may be partitioned into a plurality of coding units. In order to partition the coding units in a picture, a recursive tree structure such as a quad tree structure may be used. A video or a coding unit partitioned into different coding units using the largest coding unit as a root may be partitioned to have as many child nodes as the number of partitioned coding units. A coding unit that is not partitioned any more according to a predetermined restriction become a leaf node. That is, when it is assumed that only square partitioning is possible for one coding unit, the one coding unit may be partitioned into up to four different coding units.

Hereinafter, in an embodiment of the present disclosure, the coding unit may be used as a meaning of a unit performing encoding or a meaning of a unit performing decoding.

The prediction unit may be one that is partitioned in a shape of at least one square, rectangle or the like of the same size within one coding unit, or it may be any one prediction unit, among the prediction units partitioned within one coding unit, that is partitioned to have a shape and/or size different from those of another prediction unit.

If the coding unit is not a smallest coding unit when a prediction unit that performs intra prediction based on the coding unit is generated, intra prediction may be performed without partitioning a picture into a plurality of prediction units N×N.

The prediction part 120 and 125 may include an inter prediction part 120 that performs inter prediction and an intra prediction part 125 that performs intra prediction. It may be determined whether to use inter prediction or to perform intra prediction for a prediction unit, and determine specific information (e.g., intra prediction mode, motion vector, reference picture, etc.) according to each prediction method. At this point, a processing unit for performing prediction may be different from a processing unit for determining a prediction method and specific content. For example, a prediction method and a prediction mode may be determined in a prediction unit, and prediction may be performed in a transform unit. A residual coefficient (residual block) between the generated prediction block and the original block may be input into the transform part 130. In addition, prediction mode information, motion vector information and the like used for prediction may be encoded by the entropy coding part 165 together with the residual coefficient and transferred to a decoder. When a specific encoding mode is used, an original block may be encoded as it is and transmitted to a decoder without generating a prediction block through the prediction part 120 and 125.

The inter prediction part 120 may predict a prediction unit based on information on at least one picture among pictures before or after the current picture, and in some cases, it may predict a prediction unit based on information on a partial area that has been encoded in the current picture. The inter prediction part 120 may include a reference picture interpolation part, a motion prediction part, and a motion compensation part.

The reference picture interpolation part may receive reference picture information from the memory 155 and generate sample information of an integer number of samples or less from the reference picture. In the case of a luminance sample, a DCT-based 8-tap interpolation filter with a varying filter coefficient may be used to generate sample information of an integer number of samples or less by the unit of ¼ samples. In the case of a color difference signal, a DCT-based 4-tap interpolation filter with a varying filter coefficient may be used to generate sample information of an integer number of samples or less by the unit of ⅛ samples.

The motion prediction part may perform motion prediction based on the reference picture interpolated by the reference picture interpolation part. Various methods such as a full search-based block matching algorithm (FBMA), a three-step search (TSS), and a new three-step search algorithm (NTS) may be used as a method of calculating a motion vector. The motion vector may have a motion vector value of a unit of ½ or ¼ samples based on interpolated samples. The motion prediction part may predict a current prediction unit by varying the motion prediction method. Various methods such as a skip method, a merge method, an advanced motion vector prediction (AMVP) method, an intra-block copy method and the like may be used as the motion prediction method.

The intra prediction part 125 may generate a prediction unit based on the information on reference samples in the neighborhood of the current block, which is sample information in the current picture. When a block in the neighborhood of the current prediction unit is a block on which inter prediction has been performed and thus the reference sample is a sample on which inter prediction has been performed, the reference sample included in the block on which inter prediction has been performed may be used in place of reference sample information of a block in the neighborhood on which intra prediction has been performed. That is, when a reference sample is unavailable, at least one reference sample among available reference samples may be used in place of unavailable reference sample information.

In the intra prediction, the prediction mode may have an angular prediction mode that uses reference sample information according to a prediction direction, and a non-angular prediction mode that does not use directional information when performing prediction. A mode for predicting luminance information may be different from a mode for predicting color difference information, and intra prediction mode information used to predict luminance information or predicted luminance signal information may be used to predict the color difference information.

If the size of the prediction unit is the same as the size of the transform unit when intra prediction is performed, the intra prediction may be performed for the prediction unit based on a sample on the left side, a sample on the top-left side, and a sample on the top of the prediction unit. However, if the size of the prediction unit is different from the size of the transform unit when the intra prediction is performed, the intra prediction may be performed using a reference sample based on the transform unit. In addition, intra prediction using N×N partitioning may be used only for the smallest coding unit.

The intra prediction method may generate a prediction block after applying an Adaptive Intra Smoothing (AIS) filter to the reference sample according to a prediction mode. The type of the AIS filter applied to the reference sample may vary. In order to perform the intra prediction method, the intra prediction mode of the current prediction unit may be predicted from the intra prediction mode of the prediction unit existing in the neighborhood of the current prediction unit. When a prediction mode of the current prediction unit is predicted using the mode information predicted from the neighboring prediction unit, if the intra prediction modes of the current prediction unit is the same as the prediction unit in the neighborhood, information indicating that the prediction modes of the current prediction unit is the same as the prediction unit in the neighborhood may be transmitted using predetermined flag information, and if the prediction modes of the current prediction unit and the prediction unit in the neighborhood are different from each other, prediction mode information of the current block may be encoded by performing entropy coding.

In addition, a residual block including a prediction unit that has performed prediction based on the prediction unit generated by the prediction part 120 and 125 and residual coefficient information, which is a difference value of the prediction unit with the original block, may be generated. The generated residual block may be input into the transform part 130.

The transform part 130 may transform the residual block including the original block and the residual coefficient information of the prediction unit generated through the prediction part 120 and 125 using a transform method such as Discrete Cosine Transform (DCT) or Discrete Sine Transform (DST). Here, the DCT transform core includes at least one among DCT2 and DCT8, and the DST transform core includes DST7. Whether or not to apply DCT or DST to transform the residual block may be determined based on intra prediction mode information of a prediction unit used to generate the residual block. The transform on the residual block may be skipped. A flag indicating whether or not to skip the transform on the residual block may be encoded. The transform skip may be allowed for a residual block having a size smaller than or equal to a threshold, a luma component, or a chroma component under the 4:4:4 format.

The quantization part 135 may quantize values transformed into the frequency domain by the transform part 130. Quantization coefficients may vary according to the block or the importance of a video. A value calculated by the quantization part 135 may be provided to the inverse quantization part 140 and the rearrangement part 160.

The rearrangement part 160 may rearrange coefficient values for the quantized residual coefficients.

The rearrangement part 160 may change coefficients of a two-dimensional block shape into a one-dimensional vector shape through a coefficient scanning method. For example, the rearrangement part 160 may scan DC coefficients up to high-frequency domain coefficients using a zig-zag scan method, and change the coefficients into a one-dimensional vector shape. According to the size of the transform unit and the intra prediction mode, a vertical scan of scanning the coefficients of a two-dimensional block shape in the column direction and a horizontal scan of scanning the coefficients of a two-dimensional block shape in the row direction may be used instead of the zig-zag scan. That is, according to the size of the transform unit and the intra prediction mode, a scan method that will be used may be determined among the zig-zag scan, the vertical direction scan, and the horizontal direction scan.

The entropy coding part 165 may perform entropy coding based on values calculated by the rearrangement part 160. Entropy coding may use various encoding methods such as Exponential Golomb, Context-Adaptive Variable Length Coding (CAVLC), Context-Adaptive Binary Arithmetic Coding (CABAC), and the like.

The entropy coding part 165 may encode various information such as residual coefficient information and block type information of a coding unit, prediction mode information, partitioning unit information, prediction unit information, motion vector information, reference frame information, block interpolation information, and filtering information input from the rearrangement part 160 and the prediction parts 120 and 125.

The entropy coding part 165 may entropy-encode the coefficient value of a coding unit input from the rearrangement part 160.

The inverse quantization part 140 and the inverse transform part 145 inverse-quantize the values quantized by the quantization part 135 and inverse-transform the values transformed by the transform part 130. The residual coefficient generated by the inverse quantization part 140 and the inverse transform part 145 may be combined with the prediction unit predicted through a motion estimation part, a motion compensation part, and an intra prediction part included in the prediction part 120 and 125 to generate a reconstructed block.

The filter part 150 may include at least one among a deblocking filter, an offset correction unit, and an adaptive loop filter (ALF).

The deblocking filter may remove block distortion generated by the boundary between blocks in the reconstructed picture. In order to determine whether or not to perform deblocking, whether or not to apply the deblocking filter to the current block may be determined based on the samples included in several columns or rows included in the block. A strong filter or a weak filter may be applied according to the deblocking filtering strength needed when the deblocking filter is applied to a block. In addition, when vertical direction filtering and horizontal direction filtering are performed in applying the deblocking filter, horizontal direction filtering and vertical direction filtering may be processed in parallel.

The offset correction unit may correct an offset to the original video by the unit of sample for a video on which the deblocking has been performed. In order to perform offset correction for a specific picture, it is possible to use a method of dividing samples included in the video into a certain number of areas, determining an area to perform offset, and applying the offset to the area, or a method of applying an offset considering edge information of each sample.

Adaptive Loop Filtering (ALF) may be performed based on a value obtained by comparing the reconstructed and filtered video with the original video. After dividing the samples included in the video into predetermined groups, one filter to be applied to a corresponding group may be determined, and filtering may be performed differently for each group. A luminance signal, which is the information related to whether or not to apply ALF, may be transmitted for each coding unit (CU), and the shape and filter coefficient of an ALF filter to be applied may vary according to each block. In addition, an ALF filter of the same type (fixed type) may be applied regardless of the characteristic of a block to be applied.

The memory 155 may store the reconstructed block or picture calculated through the filter part 150, and the reconstructed and stored block or picture may be provided to the prediction part 120 and 125 when inter prediction is performed.

Figure 2:
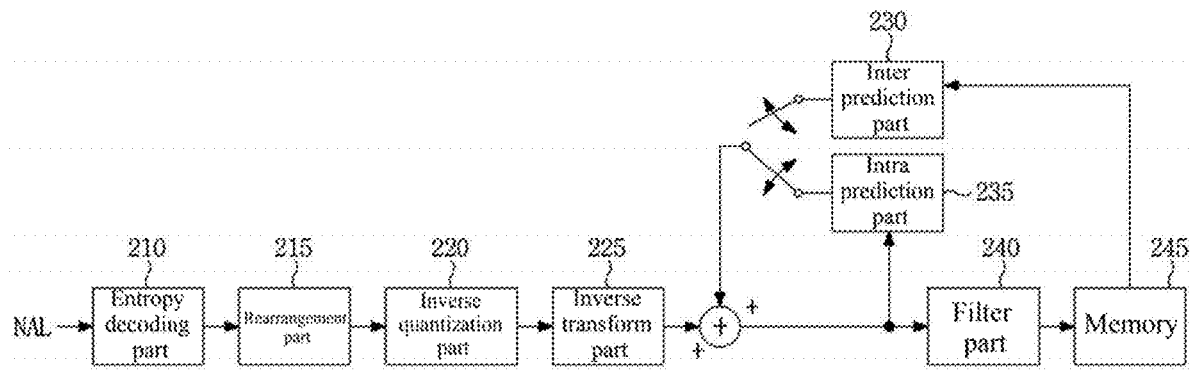
FIG. 2 is a block diagram showing a video decoder according to an embodiment of the present disclosure.

FIG. 2 is a block diagram showing a video decoder according to an embodiment of the present disclosure.

Referring to FIG. 2, a video decoder 200 may include an entropy decoding part 210, a rearrangement part 215, an inverse quantization part 220, an inverse transform part 225, a prediction part 230 and 235, a filter part 240, and a memory 245.

When a video bitstream is input from a video encoder, the input bitstream may be decoded in a procedure opposite to that of the video encoder.

The entropy decoding part 210 may perform entropy decoding in a procedure opposite to that of performing entropy coding in the entropy decoding part of the video encoder. For example, various methods corresponding to the method performed by the video encoder, such as Exponential Golomb, Context-Adaptive Variable Length Coding (CAVLC), and Context-Adaptive Binary Arithmetic Coding (CABAC), may be applied.

The entropy decoding part 210 may decode information related to intra prediction and inter prediction performed by the encoder.

The rearrangement part 215 may perform rearrangement on the bitstream entropy-decoded by the entropy decoding part 210 based on the rearrangement method performed by the encoder. The coefficients expressed in a one-dimensional vector shape may be reconstructed and rearranged as coefficients of two-dimensional block shape. The rearrangement part 215 may receive information related to coefficient scanning performed by the encoding part and perform reconstruction through a method of inverse-scanning based on the scanning order performed by the corresponding encoding part.

The inverse quantization part 220 may perform inverse quantization based on a quantization parameter provided by the encoder and a coefficient value of the rearranged block.

The inverse transform part 225 may perform inverse transform on the transform, i.e., DCT or DST, performed by the transform part on a result of the quantization performed by the video encoder, i.e., inverse DCT or inverse DST. Here, the DCT transform core may include at least one among DCT2 and DCT8, and the DST transform core may include DST7. Alternatively, when the transform is skipped in the video encoder, even the inverse transform part 225 may not perform the inverse transform. The inverse transform may be performed based on a transmission unit determined by the video encoder. The inverse transform part 225 of the video decoder may selectively perform a transform technique (e.g., DCT or DST) according to a plurality of pieces of information such as a prediction method, a size of a current block, a prediction direction and the like.

The prediction part 230 and 235 may generate a prediction block based on information related to generation of a prediction block provided by the entropy decoder 210 and information on a previously decoded block or picture provided by the memory 245.

As described above, if the size of the prediction unit and the size of the transform unit are the same when intra prediction is performed in the same manner as the operation of the video encoder, intra prediction is performed on the prediction unit based on the sample existing on the left side, the sample on the top-left side, and the sample on the top of the prediction unit. However, if the size of the prediction unit and the size of the transform unit are different when intra prediction is performed, intra prediction may be performed using a reference sample based on a transform unit. In addition, intra prediction using N×N partitioning may be used only for the smallest coding unit.

The prediction part 230 and 235 may include a prediction unit determination part, an inter prediction part, and an intra prediction part. The prediction unit determination part may receive various information such as prediction unit information input from the entropy decoding part 210, prediction mode information of the intra prediction method, information related to motion prediction of an inter prediction method, and the like, identify the prediction unit from the current coding unit, and determine whether the prediction unit performs inter prediction or intra prediction. The inter prediction part 230 may perform inter prediction on the current prediction unit based on information included in at least one picture among pictures before or after the current picture including the current prediction unit by using information necessary for inter prediction of the current prediction unit provided by the video encoder. Alternatively, the inter prediction part 230 may perform inter prediction based on information on a partial area previously reconstructed in the current picture including the current prediction unit.

In order to perform inter prediction, it may be determined, based on the coding unit, whether the motion prediction method of the prediction unit included in a corresponding coding unit is a skip mode, a merge mode, a motion vector prediction mode (AMVP mode), or an intra-block copy mode.

The intra prediction part 235 may generate a prediction block based on the information on the sample in the current picture. When the prediction unit is a prediction unit that has performed intra prediction, the intra prediction may be performed based on intra prediction mode information of the prediction unit provided by the video encoder. The intra prediction part 235 may include an Adaptive Intra Smoothing (AIS) filter, a reference sample interpolation part, and a DC filter. The AIS filter is a part that performs filtering on the reference sample of the current block, and may determine whether or not to apply the filter according to the prediction mode of the current prediction unit and apply the filter. AIS filtering may be performed on the reference sample of the current block by using the prediction mode and AIS filter information of the prediction unit provided by the video encoder. When the prediction mode of the current block is a mode that does not perform AIS filtering, the AIS filter may not be applied.

When the prediction mode of the prediction unit is a prediction unit that performs intra prediction based on a sample value obtained by interpolating the reference sample, the reference sample interpolation part may generate a reference sample of a sample unit having an integer value or less by interpolating the reference sample. When the prediction mode of the current prediction unit is a prediction mode that generates a prediction block without interpolating the reference sample, the reference sample may not be interpolated. The DC filter may generate a prediction block through filtering when the prediction mode of the current block is the DC mode.

The reconstructed block or picture may be provided to the filter part 240. The filter part 240 may include a deblocking filter, an offset correction unit, and an ALF.

Information on whether a deblocking filter is applied to a corresponding block or picture and information on whether a strong filter or a weak filter is applied when a deblocking filter is applied may be provided by the video encoder. The deblocking filter of the video decoder may be provided with information related to the deblocking filter provided by the video encoder, and the video decoder may perform deblocking filtering on a corresponding block.

The offset correction unit may perform offset correction on the reconstructed video based on the offset correction type and offset value information applied to the video when encoding is performed.

The ALF may be applied to a coding unit based on information on whether or not to apply the ALF and information on ALF coefficients provided by the encoder. The ALF information may be provided to be included in a specific parameter set.

The memory 245 may store the reconstructed picture or block and use it as a reference picture or a reference block and may provide the reconstructed picture to an output unit.

Figure 3:
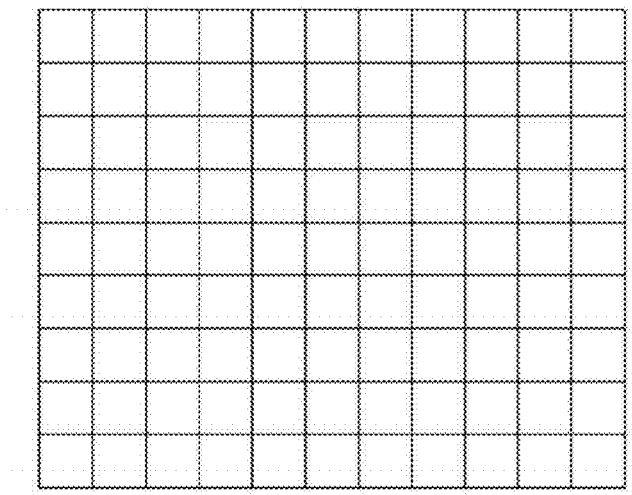
FIG. 3 is a view showing a basic coding tree unit according to an embodiment of the present disclosure.

FIG. 3 is a view showing a basic coding tree unit according to an embodiment of the present disclosure.

A coding block of a maximum size may be defined as a coding tree block. A picture is partitioned into a plurality of coding tree units (CTUs). The coding tree unit is a coding unit having a maximum size and may be referred to as a Large Coding Unit (LCU). FIG. 3 shows an example in which a picture is partitioned into a plurality of coding tree units.

The size of the coding tree unit may be defined at a picture level or a sequence level. To this end, information indicating the size of the coding tree unit may be signaled through a picture parameter set or a sequence parameter set.

For example, the size of the coding tree unit for the entire picture in a sequence may be set to 128×128. Alternatively, at the picture level, any one among 128×128 and 256×256 may be determined as the size of the coding tree unit. For example, the size of the coding tree unit may be set to 128×128 in a first picture, and the size of the coding tree unit may be set to 256×256 in a second picture.

Coding blocks may be generated by partitioning a coding tree unit. The coding block indicates a basic unit for performing encoding/decoding. For example, prediction or transform may be performed for each coding block, or a prediction encoding mode may be determined for each coding block. Here, the prediction encoding mode indicates a method of generating a prediction picture. For example, the prediction encoding mode may include prediction within a picture (intra prediction), prediction between pictures (inter prediction), current picture referencing (CPR) or intra-block copy (IBC), or combined prediction. For the coding block, a prediction block may be generated by using at least one prediction encoding mode among the intra prediction, the inter prediction, the current picture referencing, and the combined prediction.

Information indicating the prediction encoding mode of the current block may be signaled through a bitstream. For example, the information may be a 1-bit flag indicating whether the prediction encoding mode is an intra mode or an inter mode. Only when the prediction encoding mode of the current block is determined as the inter mode, the current picture referencing or the combined prediction may be used.

The current picture reference is for setting the current picture as a reference picture and obtaining a prediction block of the current block from an area that has already been encoded/decoded in the current picture. Here, the current picture means a picture including the current block. Information indicating whether the current picture reference is applied to the current block may be signaled through a bitstream. For example, the information may be a 1-bit flag. When the flag is true, the prediction encoding mode of the current block may be determined as the current picture reference, and when the flag is false, the prediction mode of the current block may be determined as inter prediction.

Alternatively, the prediction encoding mode of the current block may be determined based on a reference picture index. For example, when the reference picture index indicates the current picture, the prediction encoding mode of the current block may be determined as the current picture reference. When the reference picture index indicates a picture other than the current picture, the prediction encoding mode of the current block may be determined as inter prediction. That is, the current picture reference is a prediction method using information on an area in which encoding/decoding has been completed in the current picture, and inter prediction is a prediction method using information on another picture in which the encoding/decoding has been completed.

The combined prediction represents an encoding mode in which two or more among the intra prediction, the inter prediction, and the current reference picture are combined. For example, when the combined prediction is applied, a first prediction block may be generated based on one among the intra prediction, the inter prediction, and the current picture referencing, and a second prediction block may be generated based on another one. When the first prediction block and the second prediction block are generated, a final prediction block may be generated through an average operation or a weighted sum operation of the first prediction block and the second prediction block. Information indicating whether or not the combined prediction is applied may be signaled through a bitstream. The information may be a 1-bit flag.

Figure 4:
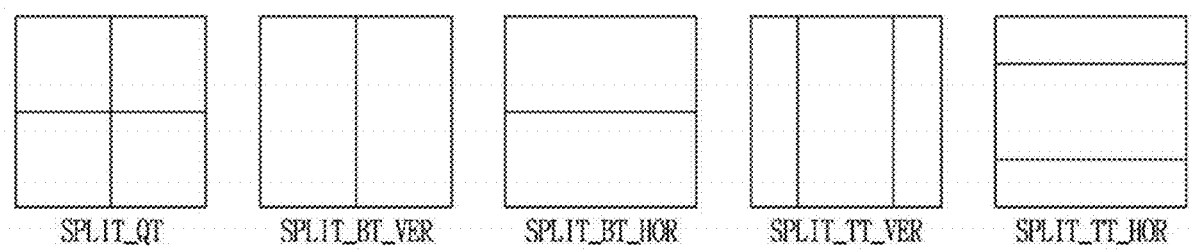
FIG. 4 is a view showing various partitioning types of a coding block.

FIG. 4 is a view showing various partitioning types of a coding block.

The coding block may be partitioned into a plurality of coding blocks based on quad tree partitioning, binary tree partitioning, or ternary tree partitioning. The partitioned coding block may be partitioned again into a plurality of coding blocks based on the quad tree partitioning, the binary tree partitioning, or the ternary tree partitioning.

The quad tree partitioning refers to a partitioning technique that partitions a current block into four blocks. As a result of the quad tree partitioning, the current block may be partitioned into four square-shaped partitions (see 'SPLIT_QT' of FIG. 4 (*a*)).

The binary tree partitioning refers to a partitioning technique that partitions a current block into two blocks. Partitioning a current block into two blocks along the vertical direction (i.e., using a vertical line crossing the current block) may be referred to as vertical direction binary tree partitioning, and partitioning a current block into two blocks along the horizontal direction (i.e., using a horizontal line crossing the current block) may be referred to as horizontal direction binary tree partitioning. As a result of the binary tree partitioning, the current block may be partitioned into two non-square shaped partitions. 'SPLIT_BT_VER' of FIG. 4 (*b*) shows a result of the vertical direction binary tree partitioning, and 'SPLIT_BT_HOR' of FIG. 4 (*c*) shows a result of the horizontal direction binary tree partitioning.

The ternary tree partitioning refers to a partitioning technique that partitions a current block into three blocks. Partitioning a current block into three blocks along the vertical direction (i.e., using two vertical lines crossing the current block) may be referred to as vertical direction ternary tree partitioning, and partitioning a current block into three blocks along the horizontal direction (i.e., using two horizontal lines crossing the current block) may be referred to as horizontal direction ternary tree partitioning. As a result of the ternary tree partitioning, the current block may be partitioned into three non-square shaped partitions. At this point, the width/height of a partition positioned at the center of the current block may be twice as large as the width/height of the other partitions. 'SPLIT_TT_VER' of FIG. 4 (*d*) shows a result of the vertical direction ternary tree partitioning, and 'SPLIT_TT_HOR' of FIG. 4 (*e*) shows a result of the horizontal direction ternary tree partitioning.

The number of times of partitioning a coding tree unit may be defined as a partitioning depth. The maximum partitioning depth of a coding tree unit may be determined at the sequence or picture level. Accordingly, the maximum partitioning depth of a coding tree unit may be different for each sequence or picture.

Alternatively, the maximum partitioning depth for each partitioning technique may be individually determined. For example, the maximum partitioning depth allowed for the quad tree partitioning may be different from the maximum partitioning depth allowed for the binary tree partitioning and/or the ternary tree partitioning.

The encoder may signal information indicating at least one among the partitioning type and the partitioning depth of the current block through a bitstream. The decoder may determine the partitioning type and the partitioning depth of a coding tree unit based on the information parsed from the bitstream.

Figure 5:
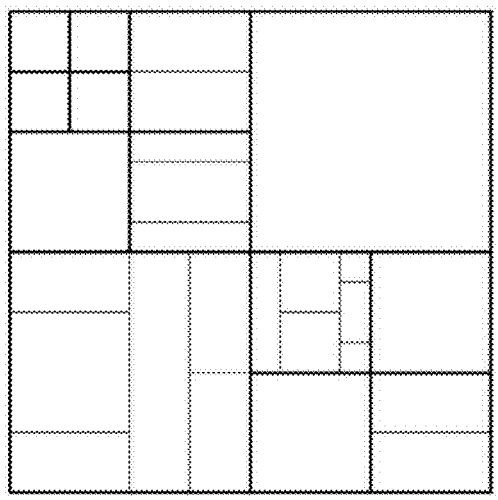
FIG. 5 is a view showing a partitioning pattern of a coding tree unit.

FIG. 5 is a view showing a partitioning pattern of a coding tree unit.

Partitioning a coding block using a partitioning technique such as quad tree partitioning, binary tree partitioning, and/or ternary tree partitioning may be referred to as multi-tree partitioning.

Coding blocks generated by applying the multi-tree partitioning to a coding block may be referred to as lower coding blocks. When the partitioning depth of a coding block is k, the partitioning depth of the lower coding blocks is set to k+1.

Contrarily, for coding blocks having a partitioning depth of k+1, a coding block having a partitioning depth of k may be referred to as an upper coding block.

The partitioning type of the current coding block may be determined based on at least one among a partitioning type of an upper coding block and a partitioning type of a neighboring coding block. Here, the neighboring coding block is a coding block adjacent to the current coding block and may include at least one among a top neighboring block and a left neighboring block of the current coding block, and a neighboring block adjacent to the top-left corner. Here, the partitioning type may include at least one among whether quad tree partitioning is applied, whether binary tree partitioning is applied, a binary tree partitioning direction, whether ternary tree partitioning is applied, and a ternary tree partitioning direction.

In order to determine a partitioning type of a coding block, information indicating whether or not the coding block can be partitioned may be signaled through a bitstream. The information is a 1-bit flag of 'split_cu_flag', and when the flag is true, it indicates that the coding block is partitioned by a quad tree partitioning technique.

When split_cu_flag is true, information indicating whether the coding block is quad-tree partitioned may be signaled through a bitstream. The information is a 1-bit flag of split_qt_flag, and when the flag is true, the coding block may be partitioned into four blocks.

For example, in the example shown in FIG. 5, as a coding tree unit is quad-tree partitioned, four coding blocks having a partitioning depth of 1 are generated. In addition, it is shown that quad tree partitioning is applied again to the first and fourth coding blocks among the four coding blocks generated as a result of the quad tree partitioning. As a result, four coding blocks having a partitioning depth of 2 may be generated.

In addition, coding blocks having a partitioning depth of 3 may be generated by applying the quad tree partitioning again to a coding block having a partitioning depth of 2.

When quad tree partitioning is not applied to the coding block, whether binary tree partitioning or ternary tree partitioning is performed on the coding block may be determined considering at least one among the size of the coding block, whether the coding block is positioned at the picture boundary, the maximum partitioning depth, and the partitioning type of a neighboring block. When it is determined to perform binary tree partitioning or ternary tree partitioning on the coding block, information indicating the partitioning direction may be signaled through a bitstream. The information may be a 1-bit flag of mtt_split_cu_vertical_flag. Based on the flag, whether the partitioning direction is a vertical direction or a horizontal direction may be determined. Additionally, information indicating whether binary tree partitioning or ternary tree partitioning is applied to the coding block may be signaled through a bitstream. The information may be a 1-bit flag of mtt_split_cu_binary_flag. Based on the flag, whether binary tree partitioning or ternary tree partitioning is applied to the coding block may be determined.

For example, in the example shown in FIG. 5, it is shown that vertical direction binary tree partitioning is applied to a coding block having a partitioning depth of 1, vertical direction ternary tree partitioning is applied to the left-side coding block among the coding blocks generated as a result of the partitioning, and vertical direction binary tree partitioning is applied to the right-side coding block.

Inter prediction is a prediction encoding mode that predicts a current block by using information of a previous picture. For example, a block at the same position as the current block in the previous picture (hereinafter, a collocated block) may be set as the prediction block of the current block. Hereinafter, a prediction block generated based on a block at the same position as the current block will be referred to as a collocated prediction block.

On the other hand, when an object existing in the previous picture has moved to another position in the current picture, the current block may be effectively predicted by using a motion of the object. For example, when the moving direction and the size of an object can be known by comparing the previous picture and the current picture, a prediction block (or a prediction picture) of the current block may be generated considering motion information of the object. Hereinafter, the prediction block generated using motion information may be referred to as a motion prediction block.

A residual block may be generated by subtracting the prediction block from the current block. At this point, when there is a motion of an object, the energy of the residual block may be reduced by using the motion prediction block instead of the collocated prediction block, and therefore, compression performance of the residual block can be improved.

As described above, generating a prediction block by using motion information may be referred to as motion compensation prediction. In most inter prediction, a prediction block may be generated based on the motion compensation prediction.

The motion information may include at least one among a motion vector, a reference picture index, a prediction direction, and a bidirectional weight index. The motion vector indicates the moving direction and the size of an object. The reference picture index specifies a reference picture of the current block among reference pictures included in a reference picture list. The prediction direction indicates any one among unidirectional L0 prediction, unidirectional L1 prediction, and bidirectional prediction (L0 prediction and L1 prediction). According to the prediction direction of the current block, at least one among motion information in the L0 direction and motion information in the L1 direction may be used. The bidirectional weight index specifies a weighting value applied to a L0 prediction block and a weighting value applied to a L1 prediction block.

Figure 6:
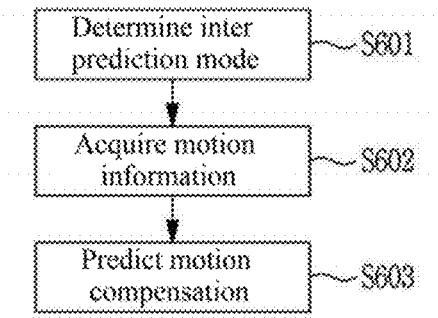
FIG. 6 is a flowchart illustrating an inter prediction method according to an embodiment of the present disclosure.

FIG. 6 is a flowchart illustrating an inter prediction method according to an embodiment of the present disclosure.

Referring to FIG. 6, the inter prediction method includes the steps of determining an inter prediction mode of a current block (S601), acquiring motion information of the current block according to the determined inter prediction mode (S602), and performing motion compensation prediction for the current block based on the acquired motion information (S603).

Here, the inter prediction mode represents various techniques for determining motion information of the current block, and may include an inter prediction mode that uses translational motion information and an inter prediction mode that uses affine motion information. For example, the inter prediction mode using translational motion information may include a merge mode and a motion vector prediction mode, and the inter prediction mode using affine motion information may include an affine merge mode and an affine motion vector prediction mode. The motion information of the current block may be determined based on a neighboring block adjacent to the current block or information parsed from a bitstream according to the inter prediction mode.

Hereinafter, the inter prediction method using affine motion information will be described in detail.

Figure 7:
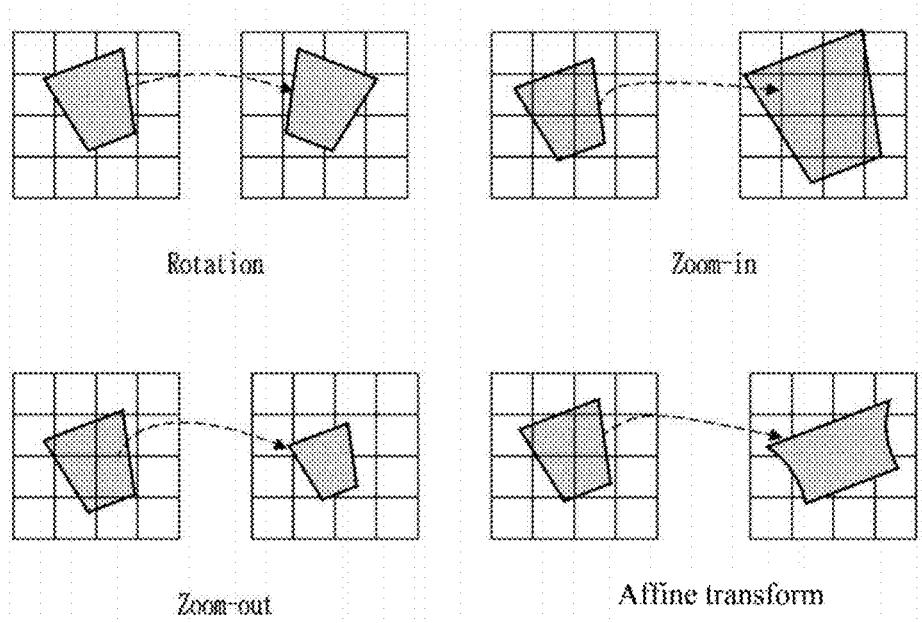
FIG. 7 is a view showing nonlinear motions of an object.

FIG. 7 is a view showing nonlinear motions of an object.

A nonlinear motion of an object may be generated in a video. For example, as shown in the example of FIG. 7, a nonlinear motion of an object, such as zoom-in, zoom-out, rotation, affine transform or the like of a camera, may occur. When a nonlinear motion of an object occurs, the motion of the object cannot be effectively expressed with a translational motion vector. Accordingly, encoding efficiency can be improved by using an affine motion instead of a translational motion in an area where a nonlinear motion of an object occurs.

Figure 8:
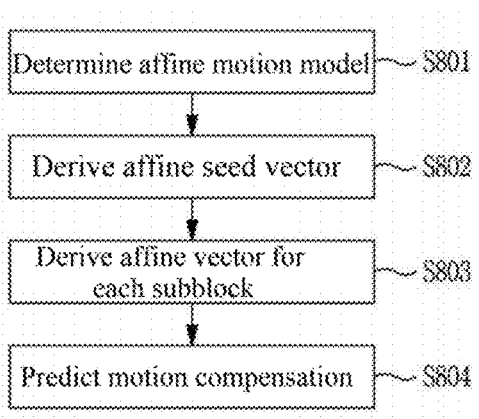
FIG. 8 is a flowchart illustrating an inter prediction method based on an affine motion according to an embodiment of the present disclosure.

FIG. 8 is a flowchart illustrating an inter prediction method based on an affine motion according to an embodiment of the present disclosure.

Whether an inter prediction technique based on an affine motion is applied to the current block may be determined based on the information parsed from a bitstream. Specifically, whether the inter prediction technique based on an affine motion is applied to the current block may be determined based on at least one among a flag indicating whether the affine merge mode is applied to the current block and a flag indicating whether the affine motion vector prediction mode is applied to the current block.

When the inter prediction technique based on an affine motion is applied to the current block, an affine motion model of the current block may be determined (S1101→S801). The affine motion model may be determined as at least one among a six-parameter affine motion model and a four-parameter affine motion model. The six-parameter affine motion model expresses an affine motion using six parameters, and the four-parameter affine motion model expresses an affine motion using four parameters.

Equation 1 expresses an affine motion using six parameters. The affine motion represents a translational motion for a predetermined area determined by affine seed vectors.

$$v_x = ax - by + e$$

$$v_y = cx + dy + f \qquad \text{[Equation 1]}$$

When an affine motion is expressed using six parameters, a complicated motion can be expressed. However, as the number of bits required for encoding each of the parameters increases, encoding efficiency may be lowered. Accordingly, the affine motion may be expressed using four parameters. Equation 2 expresses an affine motion using four parameters.

$$v_x = ax - by + e$$

$$v_y = bx + ay + f \qquad \text{[Equation 2]}$$

Information for determining an affine motion model of the current block may be encoded and signaled through a bitstream. For example, the information may be a 1-bit flag of 'affine_type_flag'. When the value of the flag is 0, it may indicate that a 4-parameter affine motion model is applied, and when the value of the flag is 1, it may indicate that a 6-parameter affine motion model is applied. The flag may be encoded by the unit of slice, tile, or block (e.g., by the unit of coding block or coding tree). When a flag is signaled at the slice level, an affine motion model determined at the slice level may be applied to all blocks belonging to the slice.

Alternatively, an affine motion model of the current block may be determined based on an affine inter prediction mode of the current block. For example, when the affine merge mode is applied, the affine motion model of the current block may be determined as a 4-parameter motion model. On the other hand, when the affine motion vector prediction mode is applied, information for determining the affine motion model of the current block may be encoded and signaled through a bitstream. For example, when the affine motion vector prediction mode is applied to the current block, the affine motion model of the current block may be determined based on the 1-bit flag of 'affine_type_flag'.

Next, an affine seed vector of the current block may be derived (S1102→S802). When a 4-parameter affine motion model is selected, motion vectors at two control points of the current block may be derived. On the other hand, when a 6-parameter affine motion model is selected, motion vectors at three control points of the current block may be derived. The motion vector at a control point may be referred to as an affine seed vector. The control point may include at least one among the top-left corner, the top-right corner, and the bottom-left corner of the current block.

Figure 9:
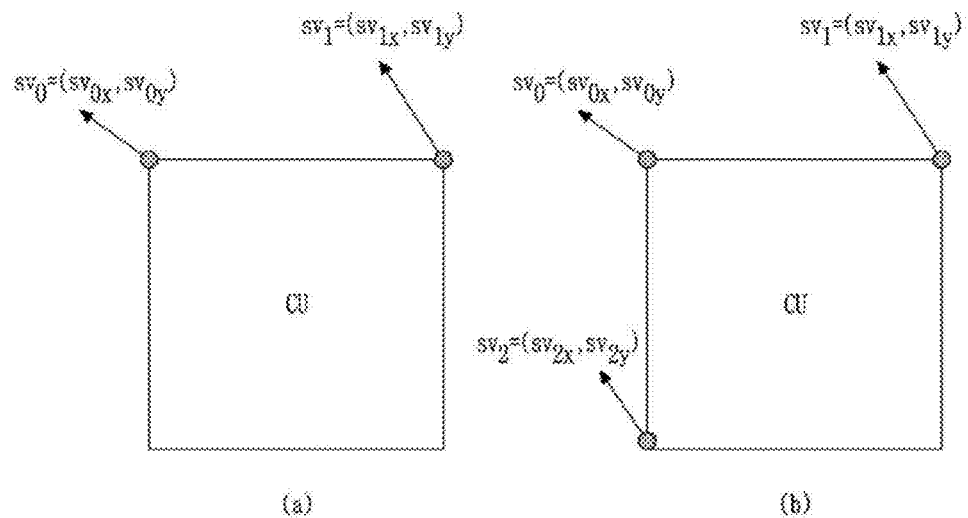
FIG. 9 is a view showing an example of affine seed vectors of each affine motion model.

FIG. 9 is a view showing an example of affine seed vectors of each affine motion model.

In the 4-parameter affine motion model, affine seed vectors may be derived for two among the top-left corner, the top-right corner, and the bottom-left corner. For example, as shown in the example of FIG. 9 (*a*), when a 4-parameter affine motion model is selected, an affine vector may be derived using the affine seed vector $sv_0$ for the top-left corner of the current block (e.g., top-left sample (x1, y1)) and the affine seed vector $sv_1$ for the top-right corner of the current block (e.g., the top-right sample (x1, y1)). It is also possible to use an affine seed vector for the bottom-left corner instead of the affine seed vector for the top-left corner, or use an affine seed vector for the bottom-left corner instead of the affine seed vector for the top-right corner.

In the 6-parameter affine motion model, affine seed vectors may be derived for the top-left corner, the top-right corner, and the bottom-left corner. For example, as shown in the example of FIG. 9 (*b*), when a 6-parameter affine motion model is selected, an affine vector may be derived using the affine seed vector $sv_0$ for the top-left corner of the current block (e.g., top-left sample (x1, y1)), the affine seed vector $sv_1$ for the top-right corner of the current block (e.g., the top-right sample (x1, y1)), and the affine seed vector $sv_2$ for the top-left corner of the current block (e.g., top-left sample (x2, y2)).

In the embodiment described below, in the 4-parameter affine motion model, the affine seed vectors of the top-left control point and the top-right control point will be referred to as a first affine seed vector and a second affine seed vector, respectively. In the embodiments using the first affine seed vector and the second affine seed vector described below, at least one among the first affine seed vector and the second affine seed vector may be replaced by the affine seed vector of the bottom-left control point (a third affine seed vector) or the affine seed vector of the bottom-right control point (a fourth affine seed vector).

In addition, in the 6-parameter affine motion model, the affine seed vectors of the top-left control point, the top-right control point, and the bottom-left control point will be referred to as a first affine seed vector, a second affine seed vector, and a third affine seed vector, respectively. In the embodiments using the first affine seed vector, the second affine seed vector, and the third affine seed vector described below, at least one among the first affine seed vector, the second affine seed vector, and the third affine seed vector may be replaced by the affine seed vector of the bottom-right control point (a fourth affine seed vector).

An affine vector may be derived for each subblock by using the affine seed vectors (S803). Here, the affine vector represents a translational motion vector derived based on the affine seed vectors. The affine vector of a subblock may be referred to as an affine subblock motion vector or a subblock motion vector.

Figure 10:
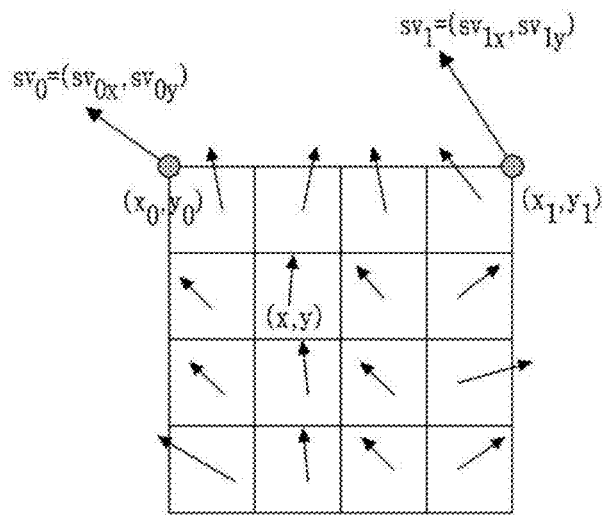
FIG. 10 is a view showing an example of affine vectors of subblocks in a 4-parameter motion model.

FIG. 10 is a view showing an example of affine vectors of subblocks in a 4-parameter motion model.

The affine vector of the subblock may be derived based on the position of the control point, the position of the subblock, and the affine seed vector. For example, Equation 3 shows an example of deriving an affine subblock vector.

$$v_x = \frac{(sv_{1x} - sv_{0x})}{(x_1 - x_0)}(x - x_0) - \frac{(sv_{1y} - sv_{0y})}{(x_1 - x_0)}(y - y_0) + sv_{0x}$$
$$v_y = \frac{(sv_{1y} - sv_{0y})}{(x_1 - x_0)}(x - x_0) - \frac{(sv_{1x} - sv_{0x})}{(x_1 - x_0)}(y - y_0) + sv_{0y}$$
[Equation 3]

In Equation 3, (x, y) denotes the position of a subblock. Here, the position of a subblock indicates the position of a reference sample included in the subblock. The reference sample may be a sample positioned at the top-left corner of the subblock, or a sample of which at least one among the x-axis and y-axis coordinates is a center point. ($x_0$, $y_0$) denotes the position of the first control point, and ($sv_{0x}$, $sv_{0y}$) denotes the first affine seed vector. In addition, (x1, y1) denotes the position of the second control point, and ($sv_{1x}$, $sv_{1y}$) denotes the second affine seed vector.

When the first control point and the second control point correspond to the top-left corner and the top-right corner of the current block respectively, $x_1-x_0$ may be set to a value equal to the width of the current block.

Thereafter, motion compensation prediction for each subblock may be performed using the affine vector of each subblock (S1104→S804). As a result of performing the motion compensation prediction, a prediction block for each subblock may be generated. The prediction blocks of the subblocks may be set as the prediction blocks of the current block.

Next, an inter prediction method using translational motion information will be described in detail.

Motion information of the current block may be derived from motion information of another block. Here, another block may be a block encoded/decoded by inter prediction before the current block. Setting the motion information of the current block to be equal to the motion information of another block may be defined as a merge mode. In addition, setting the motion vector of another block as the prediction value of the motion vector of the current block may be defined as a motion vector prediction mode.

Figure 11:
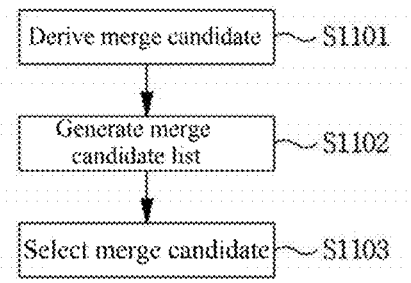
FIG. 11 is a flowchart illustrating a process of deriving motion information of a current block using a merge mode.

FIG. 11 is a flowchart illustrating a process of deriving motion information of a current block using a merge mode.

A merge candidate of the current block may be derived (S1101). The merge candidate of the current block may be derived from a block encoded/decoded by inter prediction before the current block.

Figure 12:
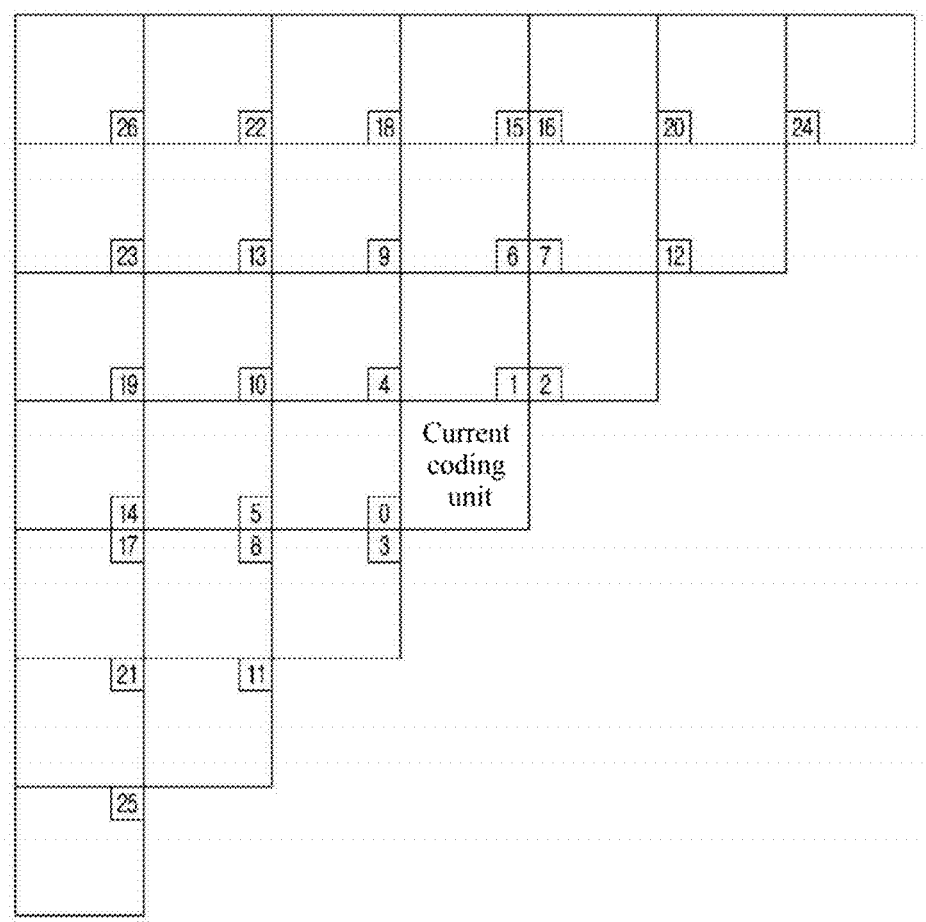
FIG. 12 is a view showing an example of candidate blocks used for deriving a merge candidate.

FIG. 12 is a view showing an example of candidate blocks used for deriving a merge candidate.

The candidate blocks may include at least one among neighboring blocks including a sample adjacent to the current block or non-neighboring blocks including a sample not adjacent to the current block. Hereinafter, samples for determining candidate blocks are defined as reference samples. In addition, a reference sample adjacent to the current block is referred to as a neighboring reference sample, and a reference sample not adjacent to the current block is referred to as a non-neighboring reference sample.

The neighboring reference sample may be included in a neighboring column of the leftmost column of the current block or a neighboring row of the uppermost row of the current block. For example, when the coordinates of the top-left sample of the current block is (0, 0), at least one among a block including a reference sample at the position of (−1, H−1), a block including a reference sample at the position of (W−1, −1), a block including a reference sample at the position of (W, −1), a block including a reference sample at the position of (−1, H), and a block including a reference sample at the position of (−1, −1) may be used as a candidate block. Referring to the drawing, neighboring blocks of index 0 to 4 may be used as candidate blocks.

The non-neighboring reference sample represents a sample of which at least one among an x-axis distance and a y-axis distance from a reference sample adjacent to the current block has a predefined value. For example, at least one among a block including a reference sample of which the x-axis distance from the left reference sample is a predefined value, a block including a non-neighboring sample of which the y-axis distance from the top reference sample is a predefined value, and a block including a non-neighboring sample of which the x-axis distance and the y-axis distance from the top-left reference sample are predefined values may be used as a candidate block. The predefined values may be a natural number such as 4, 8, 12, 16 or the like. Referring to the drawing, at least one among the blocks of index 5 to 26 may be used as a candidate block.

A sample not positioned on the same vertical line, horizontal line, or diagonal line as the neighboring reference sample may be set as a non-neighboring reference sample.

Figure 13:
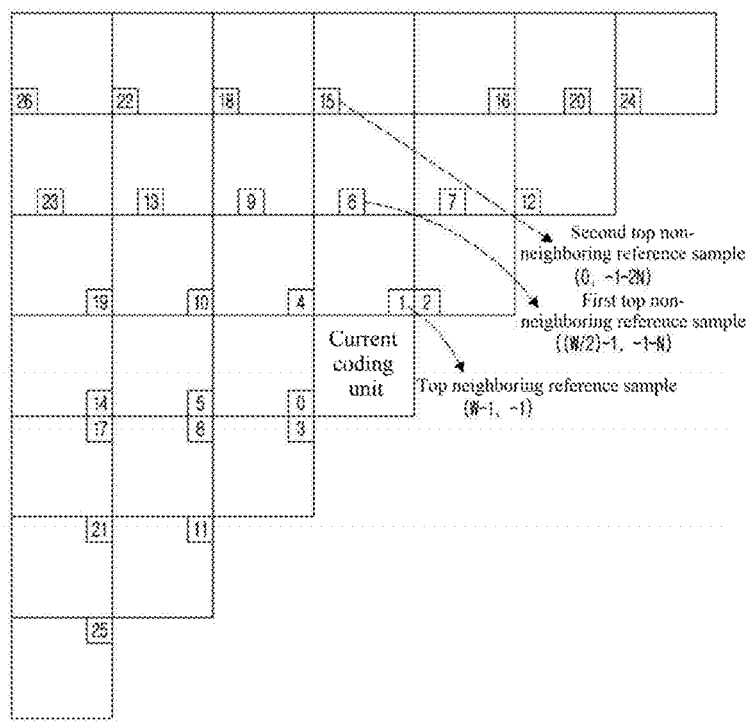
FIG. 13 is a view showing positions of reference samples.

FIG. 13 is a view showing positions of reference samples.

As shown in the example of FIG. 13, the x coordinates of the top non-neighboring reference samples may be set to be different from the x coordinates of the top neighboring reference samples. For example, when the position of the top neighboring reference sample is (W−1, −1), the position of a top non-neighboring reference sample separated as much as N from the top neighboring reference sample on the y-axis may be set to ((W/2)−1, −1−N), and the position of a top non-neighboring reference sample separated as much as 2N from the top neighboring reference sample on the y-axis may be set to (0, −1−2N). That is, the position of a non-adjacent reference sample may be determined based on the position of an adjacent reference sample and a distance from the adjacent reference sample.

Hereinafter, a candidate block including a neighboring reference sample among the candidate blocks is referred to as as a neighboring block, and a block including a non-neighboring reference sample is referred to as a non-neighboring block.

When the distance between the current block and the candidate block is greater than or equal to a threshold value, the candidate block may be set to be unavailable as a merge candidate. The threshold value may be determined based on the size of the coding tree unit. For example, the threshold value may be set to the height (ctu_height) of the coding tree unit or a value obtained by adding or subtracting an offset to or from the height (e.g., ctu_height ±N) of the coding tree unit. The offset N is a value predefined in the encoder and the decoder, and may be set to 4, 8, 16, 32 or ctu_height.

When the difference between the y-axis coordinate of the current block and the y-axis coordinate of a sample included in a candidate block is greater than the threshold value, the candidate block may be determined to be unavailable as a merge candidate.

Alternatively, a candidate block that does not belong to the same coding tree unit as the current block may be set to be unavailable as a merge candidate. For example, when a reference sample deviates from the top boundary of a coding tree unit to which the current block belongs, a candidate block including the reference sample may be set to be unavailable as a merge candidate.

When the top boundary of the current block is adjacent to the top boundary of the coding tree unit, a plurality of candidate blocks is determined to be unavailable as a merge candidate, and thus the encoding/decoding efficiency of the current block may decrease. To solve this problem, candidate blocks may be set so that the number of candidate blocks positioned on the left side of the current block is greater than the number of candidate blocks positioned on the top of the current block.

Figure 14:
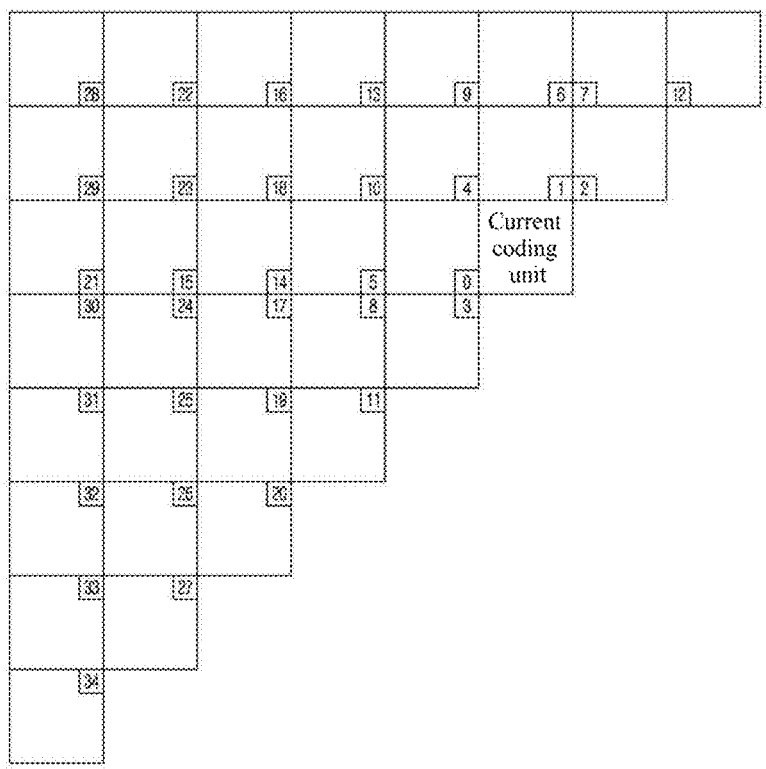
FIG. 14 is a view showing an example of candidate blocks used for deriving a merge candidate.

FIG. 14 is a view showing an example of candidate blocks used for deriving a merge candidate.

As shown in the example of FIG. 14, top blocks belonging to top N block columns of the current block and left-side blocks belonging to M left-side block columns of the current block may be set as candidate blocks. At this point, the number of left-side candidate blocks may be set to be greater than the number of top candidate blocks by setting M to be greater than N.

For example, the difference between the y-axis coordinate of the reference sample in the current block and the y-axis coordinate of the top block that can be used as a candidate block may be set not to exceed N times of the height of the current block. In addition, the difference between the x-axis coordinate of the reference sample in the current block and the x-axis coordinate of the left-side block that can be used as a candidate block may be set not to exceed M times of the width of the current block.

For example, in the example shown in FIG. 14, it is shown that blocks belonging to the top two block columns of the current block and blocks belonging to the left five block columns of the current block are set as candidate blocks.

A merge candidate may also be derived from a temporally neighboring block included in a picture different from the current block. For example, a merge candidate may be derived from a collocated block included in a collocated picture.

The motion information of the merge candidate may be set to be equal to the motion information of the candidate block. For example, at least one among a motion vector, a reference picture index, a prediction direction, and a bidirectional weight index of the candidate block may be set as motion information of the merge candidate.

A merge candidate list including merge candidates may be generated (S1102). The merge candidates may be divided into an adjacent merge candidate derived from a neighboring block adjacent to the current block and a non-adjacent merge candidate derived from a non-neighboring block.

Indexes of the merge candidates in the merge candidate list may be assigned in a predetermined order. For example, an index assigned to an adjacent merge candidate may have a value smaller than an index assigned to a non-adjacent merge candidate. Alternatively, an index may be assigned to each of the merge candidates based on the index of each block shown in FIG. 12 or 14.

When a plurality of merge candidates is included in the merge candidate list, at least one among the plurality of merge candidates may be selected (S1103). At this point, information indicating whether motion information of the current block is derived from an adjacent merge candidate may be signaled through a bitstream. The information may be a 1-bit flag. For example, a syntax element isAdjancentMergeFlag indicating whether the motion information of the current block is derived from an adjacent merge candidate may be signaled through a bitstream. When the value of the syntax element isAdjancentMergeFlag is 1, motion information of the current block may be derived based on the adjacent merge candidate. On the other hand, when the value of the syntax element isAdjancentMergeFlag is 0, motion information of the current block may be derived based on a non-adjacent merge candidate.

Information for specifying any one among a plurality of merge candidates may be signaled through a bitstream. For example, information indicating an index of any one among the merge candidates included in the merge candidate list may be signaled through a bitstream.

When isAdjacentMergeflag is 1, syntax element merge_idx specifying any one among the adjacent merge candidates may be signaled. The maximum value of syntax element merge_idx may be set to a value obtained by subtracting 1 from the number of adjacent merge candidates.

When isAdjacentMergeflag is 0, syntax element NA_merge_idx specifying any one among the non-adjacent merge candidates may be signaled. The syntax element NA_merge_idx represents a value obtained by subtracting the number of adjacent merge candidates from the index of the non-adjacent merge candidate. The decoder may select a non-adjacent merge candidate by adding the number of adjacent merge candidates to an index specified by NA_merge_idx.

When the number of merge candidates included in the merge candidate list is smaller than a threshold value, the merge candidate included in the inter-region motion information list may be added to the merge candidate list. Here, the threshold value may be the maximum number of merge candidates that the merge candidate list may include or a value obtained by subtracting an offset from the maximum number of merge candidates. The offset may be a natural number such as 1, 2 or the like. The inter-region motion information list may include a merge candidate derived based on a block encoded/decoded before the current block.

The inter-region motion information list includes a merge candidate derived from a block encoded/decoded based on inter prediction in the current picture. For example, motion information of a merge candidate included in the inter-region motion information list may be set to be equal to motion information of a block encoded/decoded based on inter prediction. Here, the motion information may include at least one among a motion vector, a reference picture index, a prediction direction, and a bidirectional weight index.

For convenience of explanation, a merge candidate included in the inter-region motion information list will be referred to as an inter-region merge candidate.

The maximum number of merge candidates that the inter-region motion information list may include may be predefined by an encoder and a decoder. For example, the maximum number of merge candidates that the inter-region motion information list may include may be 1, 2, 3, 4, 5, 6, 7, 8 or more (e.g., 16).

Alternatively, information indicating the maximum number of merge candidates in the inter-region motion information list may be signaled through a bitstream. The information may be signaled at the sequence, picture, or slice level.

Alternatively, the maximum number of merge candidates of the inter-region motion information list may be determined according to the size of a picture, the size of a slice, or the size of a coding tree unit.

The inter-region motion information list may be initialized by the unit of picture, slice, tile, brick, coding tree unit, or coding tree unit line (row or column). For example, when a slice is initialized, the inter-region motion information list is also initialized, and the inter-region motion information list may not include any merge candidate.

Alternatively, information indicating whether or not to initialize the inter-region motion information list may be signaled through a bitstream. The information may be signaled at the slice, tile, brick, or block level. Until the information indicates to initialize the inter-region motion information list, a previously configured inter-region motion information list may be used.

Alternatively, information on the initial inter-region merge candidate may be signaled through a picture parameter set or a slice header. Although the slice is initialized, the inter-region motion information list may include the initial inter-region merge candidate. Accordingly, an inter-region merge candidate may be used for a block that is the first encoding/decoding target in the slice.

Blocks are encoded/decoded according to an encoding/decoding order, and blocks encoded/decoded based on inter prediction may be sequentially set as an inter-region merge candidate according to an encoding/decoding order.

Figure 15:
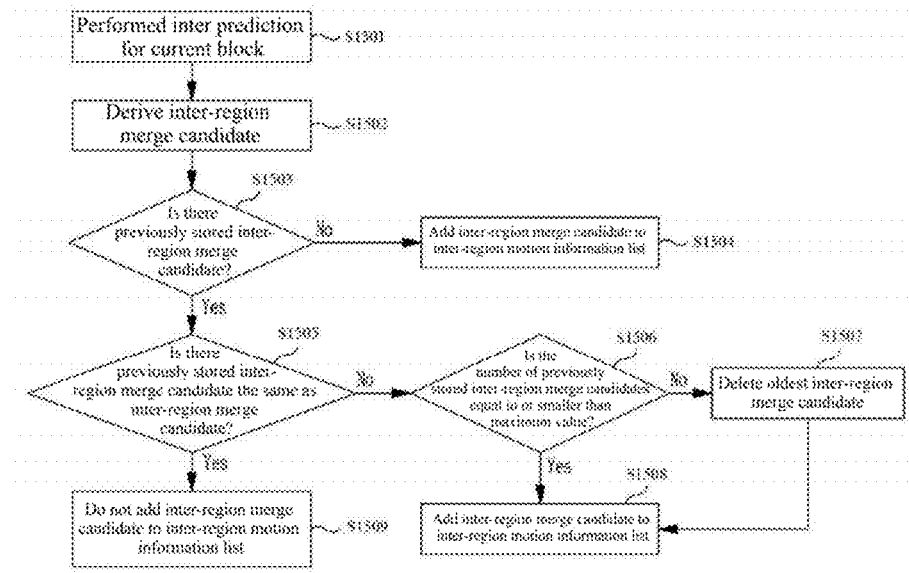
FIG. 15 is a flowchart illustrating a process of updating an inter-region motion information list.

FIG. 15 is a flowchart illustrating a process of updating an inter-region motion information list.

When inter prediction is performed on the current block (S1501), an inter-region merge candidate may be derived based on the current block (S1502). Motion information of the inter-region merge candidate may be set to be equal to the motion information of the current block.

When the inter-region motion information list is empty (S1503), the inter-region merge candidate derived based on the current block may be added to the inter-region motion information list (S1504).

When the inter-region motion information list already includes the inter-region merge candidate (S1503), a redundancy check may be performed on the motion information of the current block (or the inter-region merge candidate derived based on the current block) (S1505). The redundancy check is for determining whether motion information of an inter-region merge candidate previously stored in the inter-region motion information list and motion information of the current block are the same. The redundancy check may be performed on all inter-region merge candidates previously stored in the inter-region motion information list. Alternatively, the redundancy check may be performed on inter-region merge candidates having an index larger than a threshold value or smaller than a threshold value among inter-region merge candidates previously stored in the inter-region motion information list.

When an inter-region merge candidate having the same motion information as the motion information of the current block is not included, the inter-region merge candidate derived based on the current block may be added to the inter-region motion information list (S1508). Whether the inter-region merge candidates are the same may be determined based on whether motion information (e.g., a motion vector and/or a reference picture index) of the inter-region merge candidates is the same.

At this point, when the maximum number of inter-region merge candidates are already stored in the inter-region motion information list (S1506), the oldest inter-region merge candidate is deleted (S1507), and the inter-region merge candidate derived based on the current block may be added to the inter-region motion information list (S1508).

Each of the inter-region merge candidates may be identified by an index. When an inter-region merge candidate derived from the current block is added to the inter-region motion information list, the lowest index (e.g., 0) is assigned to the inter-region merge candidate, and indexes of the previously stored inter-region merge candidates may be increased by 1. At this point, when the maximum number of inter-region merge candidates are already stored in the inter-region motion information list, an inter-region merge candidate having the largest index is removed.

Alternatively, when the inter-region merge candidate derived from the current block is added to the inter-region motion information list, the largest index may be assigned to the inter-region merge candidate. For example, when the number of inter-region merge candidates previously stored in the inter-region motion information list is smaller than a maximum value, an index having the same value as the number of previously stored inter-region merge candidates may be assigned to the inter-region merge candidate. Alternatively, when the number of inter-region merge candidates previously stored in the inter-region motion information list is the same as the maximum value, an index subtracting 1 from the maximum value may be assigned to the inter-region merge candidate. In addition, an inter-region merge candidate having the smallest index is removed, and indexes of remaining previously stored inter-region merge candidates may be decreased by 1.

Figure 16:
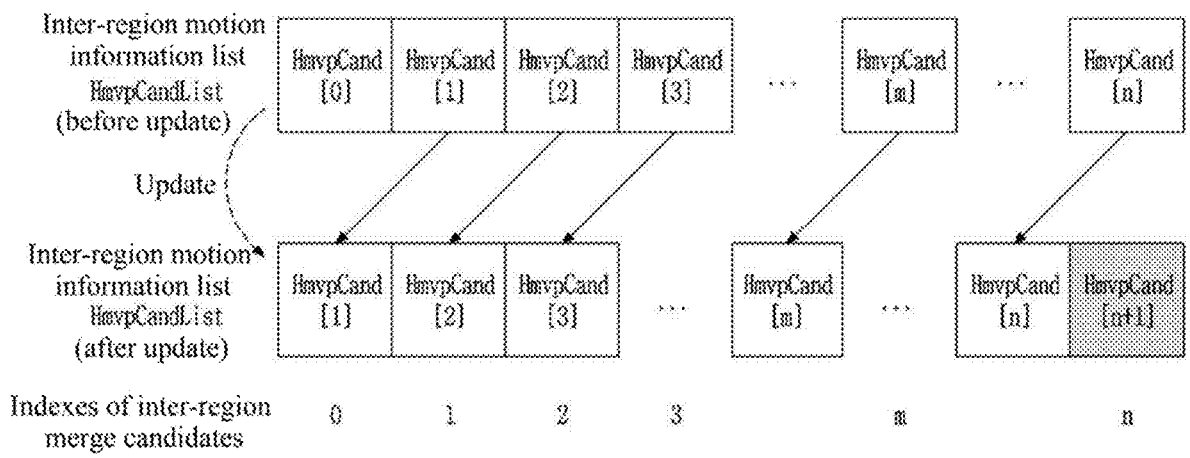
FIG. 16 is a view showing an embodiment of updating an inter-region merge candidate list.

FIG. 16 is a view showing an embodiment of updating an inter-region merge candidate list.

It is assumed that as the inter-region merge candidate derived from the current block is added to the inter-region merge candidate list, the largest index is assigned to the inter-region merge candidate. In addition, it is assumed that the maximum number of inter-region merge candidates is already stored in the inter-region merge candidate list.

When the inter-region merge candidate HmvpCand[n+1] derived from the current block is added to the inter-region merge candidate list HmvpCandList, the inter-region merge candidate HmvpCand[0] having the smallest index among the previously stored inter-region merge candidates is deleted, and the indexes of the remaining inter-region merge candidates may be decreased by 1. In addition, the index of the inter-region merge candidate HmvpCand[n+1] derived from the current block may be set to a maximum value (n in the example shown in FIG. 16).

When an inter-region merge candidate the same as the inter-region merge candidate derived based on the current block is previously stored (S1505), the inter-region merge candidate derived based on the current block may not be added to the inter-region motion information list (S1509).

Alternatively, as the inter-region merge candidate derived based on the current block is added to the inter-region motion information list, a previously stored inter-region merge candidate that is the same as the inter-region merge candidate may be removed. In this case, an effect the same as newly updating the index of the previously stored inter-region merge candidate is obtained.

Figure 17:
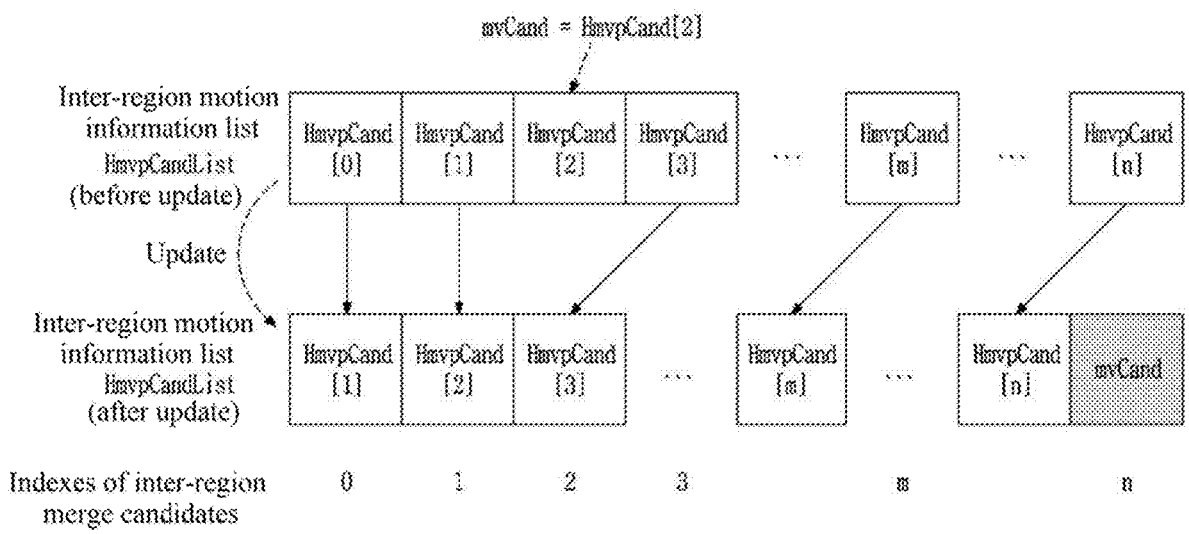
FIG. 17 is a view showing an example in which an index of a previously stored inter-region merge candidate is updated.

FIG. 17 is a view showing an example in which an index of a previously stored inter-region merge candidate is updated.

When the index of a previously stored inter-region merge candidate mvCand that is the same as the inter-region merge candidate mvCand derived based on the current block is hIdx, the previously stored inter-region merge candidate is deleted, and indexes of inter-region merge candidates having an index larger than hIdx may be decreased by 1. For example, in the example shown in FIG. 17, it is shown that HmvpCand[2] the same as mvCand is deleted from the inter-region motion information list HvmpCandList, and the indexes of HmvpCand[3] to HmvpCand[n] are decreased by 1.

In addition, the inter-region merge candidate mvCand derived based on the current block may be added to the end of the inter-region motion information list.

Alternatively, the index assigned to the previously stored inter-region merge candidate that is the same as the inter-region merge candidate derived based on the current block may be updated. For example, the index of the previously stored inter-region merge candidate may be changed to a minimum value or a maximum value.

It may be set not to add motion information of blocks included in a predetermined area to the inter-region motion information list. For example, an inter-region merge candidate derived based on motion information of a block included in the merge processing area may not be added to the inter-region motion information list. Since an encoding/decoding order is not defined for the blocks included in the merge processing area, it is inappropriate to use motion information of any one among the blocks for inter prediction of another block. Accordingly, inter-region merge candidates derived based on the blocks included in the merge processing area may not be added to the inter-region motion information list.

When motion compensation prediction is performed by the unit of subblock, an inter-region merge candidate may be derived based on motion information of a representative subblock among a plurality of subblocks included in the current block. For example, when a subblock merge candidate is used for the current block, an inter-region merge candidate may be derived based on motion information of a representative subblock among the subblocks.

Motion vectors of the subblocks may be derived in the following order. First, any one among the merge candidates included in the merge candidate list of the current block is selected, and an initial shift vector (shVector) may be derived based on the motion vector of the selected merge candidate. Then, a shift subblock, in which the position of the reference sample is (xColSb, yColSb), may be derived as the initial shift vector is added at the position (xSb, ySb) of the reference sample (e.g., the top-left sample or the sample at the center) of each subblock in the coding block. Equation 4 shows an equation for deriving a shift subblock.

$$(\text{xcolSb}, \text{ycolSb}) = (xSb + \text{shVector}[0] >> 4, ySb + \text{shVector}[1] >> 4) \quad [\text{Equation 4}]$$

Then, the motion vector of a collocated block corresponding to the center position of the subblock including (xColSb, yColSb) may be set as the motion vector of the subblock including (xSb, ySb).

The representative subblock may mean a subblock including the top-left sample or the sample at the center of the current block.

Figure 18:
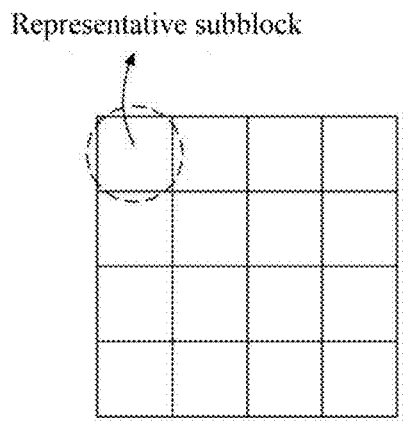
FIG. 18 is a view showing the position of a representative subblock.
Figure 18:
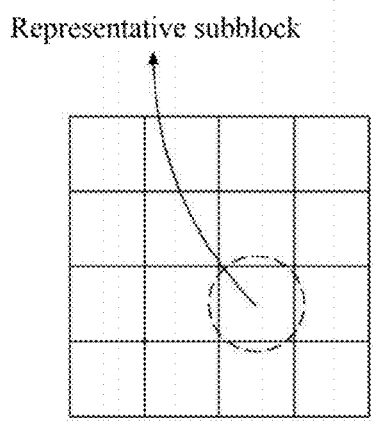

FIG. 18 is a view showing the position of a representative subblock.

FIG. 18 (a) shows an example in which the subblock positioned at the top-left of the current block is set as the representative subblock, and FIG. 18 (b) shows an example in which the subblock positioned at the center of the current block is set as the representative subblock. When motion compensation prediction is performed by unit of subblock, an inter-region merge candidate of the current block may be derived based on the motion vector of the subblock including the top-left sample of the current block or the subblock including the sample at the center of the current block.

It may be determined whether or not to use the current block as an inter-region merge candidate, based on the inter prediction mode of the current block. For example, a block encoded/decoded based on an affine motion model may be set to be unavailable as an inter-region merge candidate. Accordingly, although the current block is encoded/decoded by inter prediction, when the inter prediction mode of the current block is the affine prediction mode, the inter region motion information list may not be updated based on the current block.

Alternatively, the inter-region merge candidate may be derived based on at least one subblock vector among the subblocks included in the block encoded/decoded based on the affine motion model. For example, the inter-region merge candidate may be derived using a subblock positioned at the top-left, a subblock positioned at the center, or a subblock positioned at the top-right side of the current block. Alternatively, an average value of subblock vectors of a plurality of subblocks may be set as the motion vector of the inter-region merge candidate.

Alternatively, the inter-region merge candidate may be derived based on an average value of affine seed vectors of the block encoded/decoded based on the affine motion model. For example, an average of at least one among the first affine seed vector, the second affine seed vector, and the third affine seed vector of the current block may be set as the motion vector of the inter-region merge candidate.

Alternatively, an inter-region motion information list may be configured for each inter prediction mode. For example, at least one among an inter-region motion information list for a block encoded/decoded by intra-block copy, an inter-region motion information list for a block encoded/decoded based on a translational motion model, and an inter-region motion information list for a block encoded/decoded based on an affine motion model may be defined. According to the inter prediction mode of the current block, any one among a plurality of inter-region motion information lists may be selected.

Figure 19:
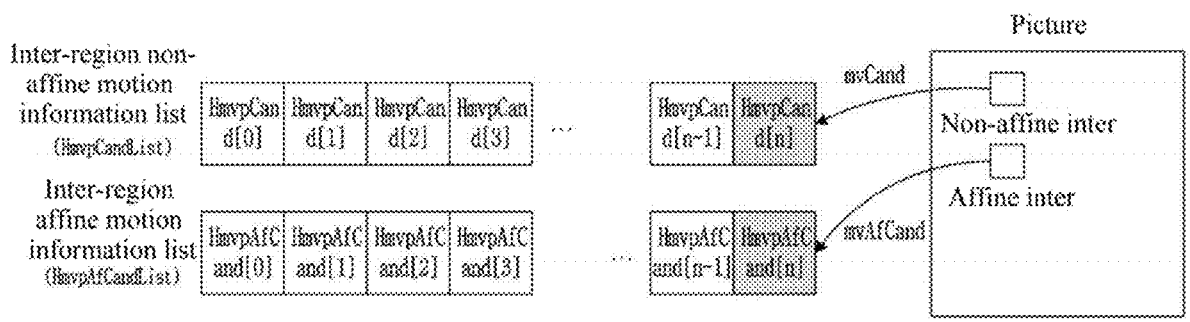
FIG. 19 is a view showing an example in which an inter-region motion information list is generated for each inter prediction mode.

FIG. 19 is a view showing an example in which an inter-region motion information list is generated for each inter prediction mode.

When a block is encoded/decoded based on a non-affine motion model, an inter-region merge candidate mvCand derived based on the block may be added to an inter-region non-affine motion information list HmvpCandList. On the other hand, when a block is encoded/decoded based on an affine motion model, an inter-region merge candidate mvAfCand derived based on the block may be added to an inter-region affine motion information list HmvpAfCandList.

Affine seed vectors of a block encoded/decoded based on the affine motion model may be stored in an inter-region merge candidate derived from the block. Accordingly, the inter-region merge candidate may be used as a merge candidate for deriving the affine seed vector of the current block.

In addition to the inter-region motion information list described above, an additional inter-region motion information list may be defined. In addition to the inter-region motion information list described above (hereinafter, referred to as a first inter-region motion information list), a long-term motion information list (hereinafter, referred to as a second inter-region motion information list) may be defined. Here, the long-term motion information list includes long-term merge candidates.

When both the first inter-region motion information list and the second inter-region motion information list are empty, first, inter-region merge candidates may be added to the second inter-region motion information list. Only after the number of available inter-region merge candidates reaches the maximum number in the second inter-region motion information list, inter-region merge candidates may be added to the first inter-region motion information list.

Alternatively, one inter-region merge candidate may be added to both the second inter-region motion information list and the first inter-region motion information list.

At this point, the second inter-region motion information list, the configuration of which has been completed, may not be updated any more. Alternatively, when the decoded region is greater than or equal to a predetermined ratio of the slice, the second inter-region motion information list may be updated. Alternatively, the second inter-region motion information list may be updated for every N coding tree unit lines.

On the other hand, the first inter-region motion information list may be updated whenever a block encoded/decoded by inter prediction is generated. However, it may be set not to use the inter-region merge candidate added to the second inter-region motion information list, to update the first inter-region motion information list.

Information for selecting any one among the first inter-region motion information list and the second inter-region motion information list may be signaled through a bitstream. When the number of merge candidates included in the merge candidate list is smaller than a threshold value, merge candidates included in the inter-region motion information list indicated by the information may be added to the merge candidate list.

Alternatively, an inter-region motion information list may be selected based on the size and shape of the current block, inter prediction mode, whether bidirectional prediction is enabled, whether motion vector refinement is enabled, or whether triangular partitioning is enabled.

Alternatively, although an inter-region merge candidate included in the first inter-region motion information list is added, when the number of merge candidates included in the merge candidate list is smaller than the maximum number of merges, the inter-region merge candidates included in the second inter-region motion information list may be added to the merge candidate list.

Figure 20:
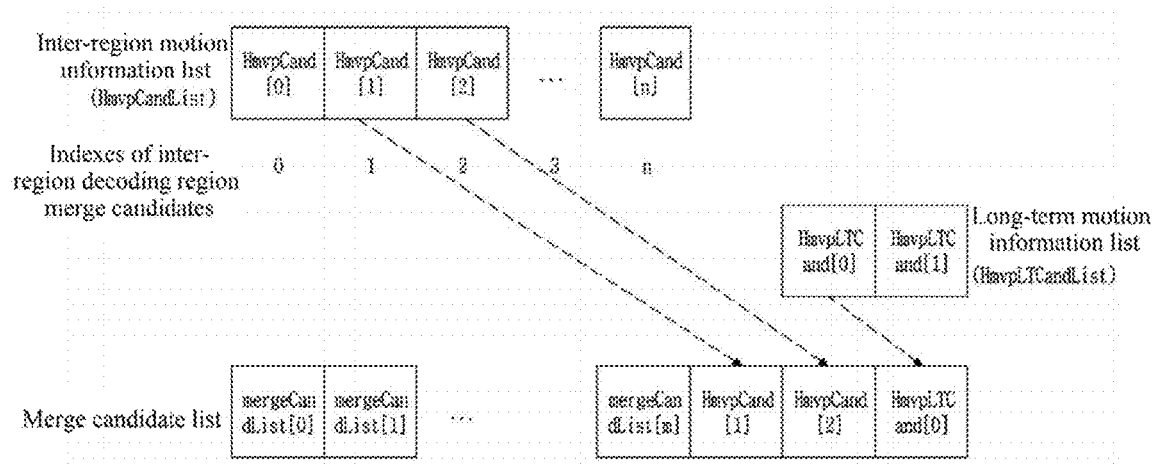
FIG. 20 is a view showing an example in which an inter-region merge candidate included in a long-term motion information list is added to a merge candidate list.

FIG. 20 is a view showing an example in which an inter-region merge candidate included in a long-term motion information list is added to a merge candidate list.

When the number of merge candidates included in the merge candidate list is smaller than the maximum number, the inter-region merge candidates included in the first inter-region motion information list HmvpCandList may be added to the merge candidate list. When the number of merge candidates included in the merge candidate list is smaller than the maximum number although the inter-region merge candidates included in the first inter-region motion information list are added to the merge candidate list, the inter-region merge candidates included in the long-term motion information list HmvpLTCandList may be added to the merge candidate list.

The inter-region merge candidate may be set to include additional information, in addition to motion information. For example, for the inter-region merge candidate, a size, a shape, or partition information of a block may be additionally stored. When the merge candidate list of the current block is constructed, only inter-region merge candidates having a size, a shape, or partition information the same as or similar to those of the current block are used among the inter-region merge candidates, or inter-region merge candidates having a size, a shape, or partition information the same as or similar to those of the current block may be added to the merge candidate list in the first place.

Alternatively, an inter-region motion information list may be generated for each of the size, shape, or partition information of a block. Among the plurality of inter-region motion information lists, a merge candidate list of the current block may be generated by using an inter-region motion information list corresponding to the shape, size, or partition information of the current block.

When the number of merge candidates included in the merge candidate list of the current block is smaller than the threshold value, the inter-region merge candidates included in the inter-region motion information list may be added to the merge candidate list. The addition process is performed in an ascending or descending order based on the index. For example, an inter-region merge candidate having the largest index may be first added to the merge candidate list.

When it is desired to add an inter-region merge candidate included in the inter-region motion information list to the merge candidate list, a redundancy check may be performed between the inter-region merge candidate and the merge candidates previously stored in the merge candidate list.

The redundancy check may be performed only on some of the inter-region merge candidates included in the inter-region motion information list. For example, the redundancy check may be performed only on inter-region merge candidates having an index larger than a threshold value or smaller than a threshold value. Alternatively, the redundancy check may be performed only on N merge candidates having the largest index or N merge candidates having the smallest index.

Alternatively, the redundancy check may be performed only on some of the merge candidates previously stored in the merge candidate list. For example, the redundancy check may be performed only on a merge candidate having an index larger than a threshold value or smaller than a threshold value, or on a merge candidate derived from a block at a specific position. Here, the specific position may include at least one among a left neighboring block, a top neighboring block, a top-right neighboring block, and a bottom-left neighboring block of the current block.

Figure 21:
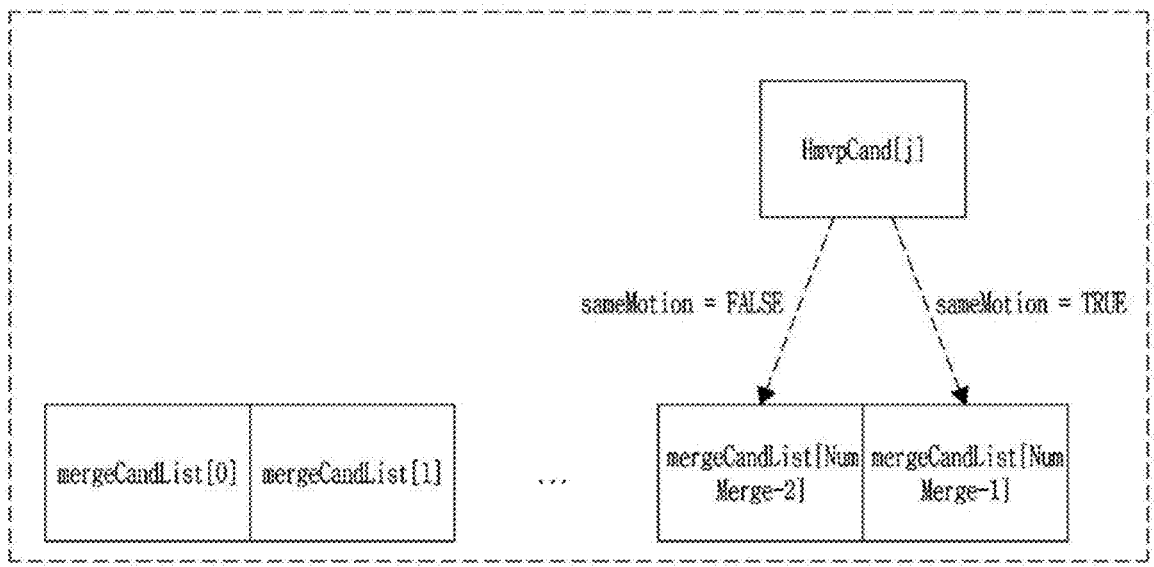
FIG. 21 is a view showing an example in which a redundancy check is performed only on some of merge candidates.

FIG. 21 is a view showing an example in which a redundancy check is performed only on some of merge candidates.

When it is desired to add the inter-region merge candidate HmvpCand[j] to the merge candidate list, a redundancy check may be performed on the inter-region merge candidate with two merge candidates mergeCandList[NumMerge−2] and mergeCandList[NumMerge−1] having the largest indexes. Here, NumMerge may represent the number of spatial merge candidates and temporal merge candidates that are available.

Unlike the example shown in the drawing, when it is desired to add an inter-region merge candidate HmvpCand[j] to the merge candidate list, a redundancy check may be performed on the inter-region merge candidate with up to two merge candidates having the smallest index. For example, it is possible to check whether mergeCandList[0] and mergeCandList[1] are the same as HmvpCand[j]. Alternatively, a redundancy check may be performed only on merge candidates derived at a specific position. For example, the redundancy check may be performed on at least one among a merge candidate derived from a neighboring block positioned on the left side of the current block and a merge candidate derived from a neighboring block positioned on the top the current block. When a merge candidate derived at a specific position does not exist in the merge candidate list, an inter-region merge candidate may be added to the merge candidate list without having a redundancy check.

When a merge candidate the same as the first inter-region merge candidate is found and a redundancy check is performed on the second inter-region merge candidate, the redundancy check with a merge candidate the same as the first inter-region merge candidate may be omitted.

Figure 22:
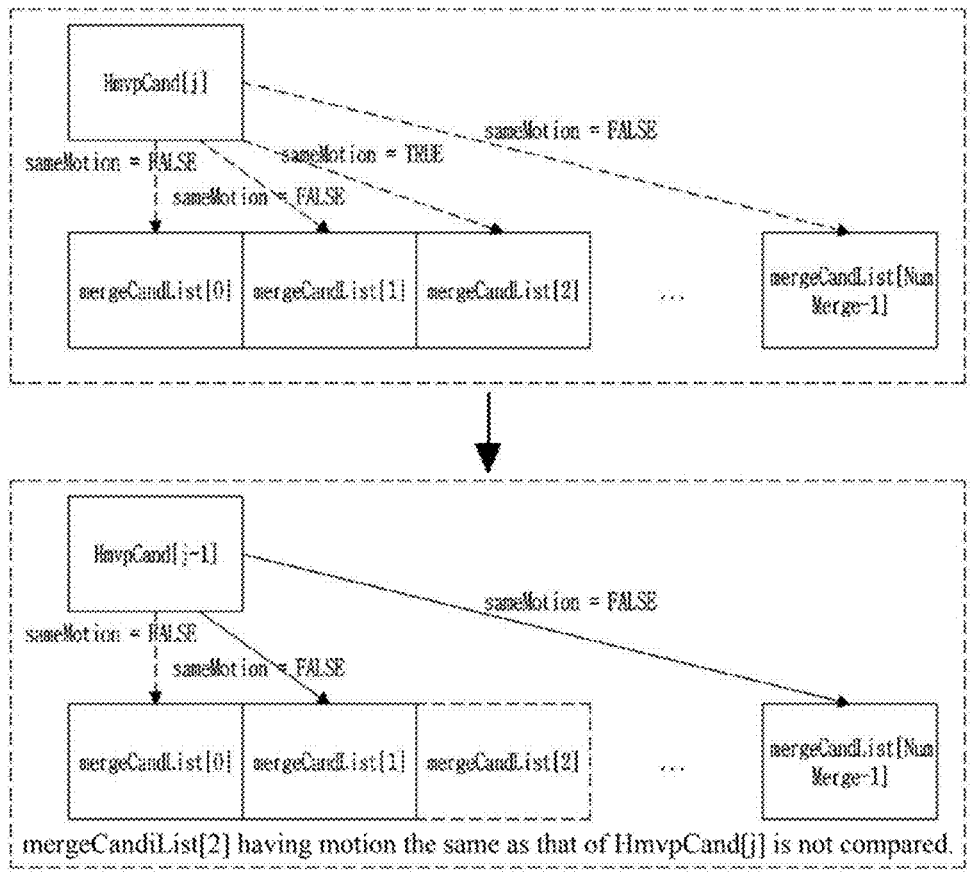
FIG. 22 is a view showing an example in which a redundancy check is omitted for a specific merge candidate.

FIG. 22 is a view showing an example in which a redundancy check is omitted for a specific merge candidate.

When it is desired to add an inter-region merge candidate HmvpCand[i] having index i to the merge candidate list, a redundancy check is performed between the inter-region merge candidate and merge candidates previously stored in the merge candidate list. At this point, when a merge candidate mergeCandList[j] the same as the inter-region merge candidate HmvpCand[i] is found, the redundancy check may be performed between the inter-region merge candidate HmvpCand[i−1] having index i−1 and the merge candidates without adding the inter-region merge candidate HmvpCand[i] to the merge candidate list. At this point, the redundancy check between the inter-region merge candidate HmvpCand[i−1] and the merge candidate mergeCandList[j] may be omitted.

For example, in the example shown in FIG. 22, it is determined that HmvpCand[i] and mergeCandList[2] are the same. Accordingly, HmvpCand[i] is not added to the merge candidate list, and a redundancy check may be performed on HmvpCand[i−1]. At this point, the redundancy check between HvmpCand[i−1] and mergeCandList[2] may be omitted.

When the number of merge candidates included in the merge candidate list of the current block is smaller than the threshold value, at least one among a pairwise merge candidate and a zero-merge candidate may be further included, in addition to the inter-region merge candidate. The pairwise merge candidate means a merge candidate having an average value of motion vectors of two or more merge candidates as a motion vector, and the zero-merge candidate means a merge candidate having a motion vector of 0.

A merge candidate may be added to the merge candidate list of the current block in the following order.

Spatial merge candidate—Temporal merge candidate—Inter-region merge candidate—(Inter-region affine merge candidate)—Pairwise merge candidate—Zero-merge candidate The spatial merge candidate means a merge candidate derived from at least one among a neighboring block and a non-neighboring block, and the temporal merge candidate means a merge candidate derived from a previous reference picture. The inter-region affine merge candidate represents an inter-region merge candidate derived from a block encoded/decoded with an affine motion model.

The inter-region motion information list may also be used in the motion vector prediction mode. For example, when the number of motion vector prediction candidates included in a motion vector prediction candidate list of the current block is smaller than a threshold value, an inter-region merge candidate included in the inter-region motion information list may be set as a motion vector prediction candidate for the current block. Specifically, the motion vector of the inter-region merge candidate may be set as a motion vector prediction candidate.

When any one among the motion vector prediction candidates included in the motion vector prediction candidate list of the current block is selected, the selected candidate may be set as the motion vector predictor of the current block. Thereafter, after a motion vector residual coefficient of the current block is decoded, a motion vector of the current block may be obtained by adding the motion vector predictor and the motion vector residual coefficient.

The motion vector prediction candidate list of the current block may be configured in the following order.

Spatial motion vector prediction candidate—Temporal motion vector prediction candidate—Inter-region merge candidate—(Inter-region affine merge candidate)—Zero-motion vector prediction candidate The spatial motion vector prediction candidate means a motion vector prediction candidate derived from at least one among a neighboring block and a non-neighboring block, and the temporal motion vector prediction candidate means a motion vector prediction candidate derived from a previous reference picture. The inter-region affine merge candidate represents an inter-region motion vector prediction candidate derived from a block encoded/decoded with the affine motion model. The zero-motion vector prediction candidate represents a candidate having a motion vector value of 0.

A coding block may be partitioned into a plurality of prediction units, and prediction may be performed on each of the partitioned prediction units. Here, a prediction unit represents a basic unit for performing the prediction.

A coding block may be partitioned using at least one among a vertical line, a horizontal line, an oblique line, and a diagonal line. Information for determining at least one among the number, the angles, and the positions of lines partitioning a coding block may be signaled through a bitstream. For example, information indicating any one among partition type candidates of a coding block may be signaled through a bitstream, or information specifying any one among a plurality of line candidates for partitioning a coding block may be signaled through a bitstream. Alternatively, information for determining the number or types of line candidates partitioning a coding block may be signaled through the bitstream. For example, whether an oblique line having an angle greater than that of a diagonal line and/or an oblique line having an angle smaller than that of a diagonal line may be used as a line candidate may be determined using a 1-bit flag.

Alternatively, at least one among the number, the angles, and the positions of lines partitioning a coding block may be adaptively determined based on at least one among the intra prediction mode of the coding block, the inter prediction mode of the coding block, the position of an available merge candidate of the coding block, and a partitioning pattern of a neighboring block.

When a coding block is partitioned into a plurality of prediction units, intra prediction or inter prediction may be performed on each of the partitioned prediction units.

Figure 23:
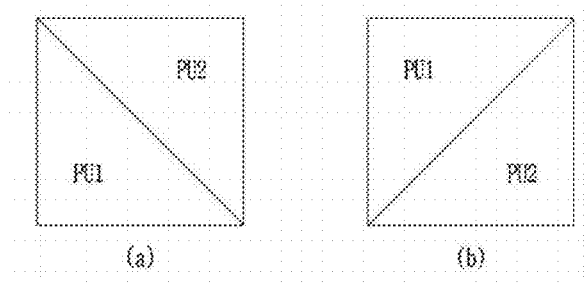
FIG. 23 is a view showing examples of applying partitioning to a coding block to obtain a plurality of prediction units using a diagonal line.

FIG. 23 is a view showing examples of applying partitioning to a coding block to obtain a plurality of prediction units using a diagonal line.

As shown in the examples of FIGS. 23 (a) and 23 (b), a coding block may be partitioned into two triangular prediction units using a diagonal line.

In FIGS. 23 (a) and 23 (b), it is shown that a coding block is partitioned into two prediction units using a diagonal line connecting two vertices of the coding block. However, the coding block may be partitioned into two prediction units using an oblique line, at least one end of which does not pass through a vertex of the coding block.

Figure 24:
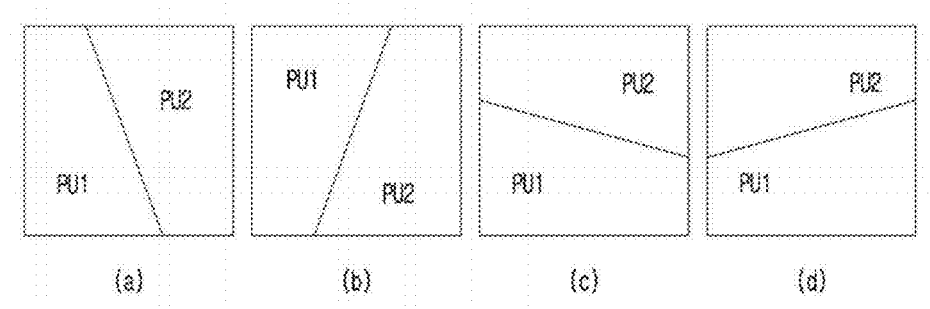
FIG. 24 is a view showing examples of applying partitioning to a coding block to obtain two prediction units.

FIG. 24 is a view showing examples of applying partitioning to a coding block to obtain two prediction units.

As shown in the examples of FIGS. 24 (a) and 24 (b), a coding block may be partitioned into two prediction units using an oblique line, both ends of which are in contact with the top boundary and the bottom boundary of the coding block, respectively.

Alternatively, as shown in the examples of FIGS. 24 (c) and 24 (d), a coding block may be partitioned into two prediction units using an oblique line, both ends of which are in contact with the left boundary and the right boundary of the coding block, respectively.

Alternatively, a coding block may be partitioned into two prediction blocks of different size. For example, a coding block may be partitioned into two prediction units of different size by setting an oblique line partitioning the coding block to contact two boundary surfaces that form one vertex.

Figure 25:
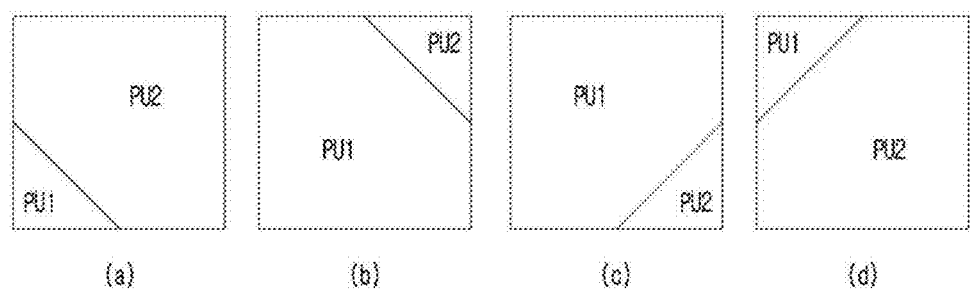
FIG. 25 is a view showing examples of applying partitioning to a coding block to obtain a plurality of prediction blocks of different size.

FIG. 25 is a view showing examples of partitioning a coding block into a plurality of prediction blocks of different size.

As shown in the examples of FIGS. 25 (a) and 25 (b), as a diagonal line connecting the top-left and bottom-right corners of the coding block is set to pass through the left boundary, the right boundary, the top boundary, or the bottom boundary, instead of passing through the top-left corner or the bottom-right corner of the coding block, the coding block may be partitioned into two prediction units having different sizes.

Alternatively, as shown in the examples of FIGS. 25 (c) and 25 (d), as a diagonal line connecting the top-right and bottom-left corners of the coding block is set to pass through the left boundary, the right boundary, the top boundary, or the bottom boundary, instead of passing through the top-left corner or the bottom-right corner of the coding block, the coding block may be partitioned into two prediction units having different sizes.

Each of the prediction units generated by partitioning a coding block will be referred to as an 'N-th prediction unit'. For example, in the examples shown in FIGS. 23 to 25, PU1 may be defined as a first prediction unit, and PU2 may be defined as a second prediction unit. The first prediction unit means a prediction unit including a sample positioned at the bottom left or a sample positioned at the top left in the coding block, and the second prediction unit means a prediction unit including a sample positioned at the top right or a sample positioned at the bottom right in the coding block.

Contrarily, a prediction unit including a sample positioned at the top right or a sample positioned at the bottom right in the coding block may be defined as a first prediction unit, and a prediction unit including a sample positioned at the bottom left or a sample positioned at the top left in the coding block may be defined as a second prediction unit.

Embodiments below are described focusing on examples of partitioning a coding block using a diagonal line. Particularly, partitioning a coding block into two prediction units using a diagonal line is referred to as diagonal partitioning or triangular partitioning, and a prediction unit generated based on the diagonal partitioning is referred to as a triangular prediction unit. However, it is also possible to apply the embodiments described below to the examples of partitioning a coding block using an oblique line of an angle different from that of a vertical line, a horizontal line, or a diagonal line.

Whether or not to apply the diagonal partitioning to a coding block may be determined based on at least one among a slice type, the maximum number of merge candidates that the merge candidate list may include, the size of the coding block, the shape of the coding block, the prediction encoding mode of the coding block, and the partitioning pattern of the parent node.

For example, whether or not to apply the diagonal partitioning to a coding block may be determined based on whether the current slice is type B. Diagonal partitioning may be allowed only when the current slice is type B.

Alternatively, whether or not to apply the diagonal partitioning to a coding block may be determined based on whether the maximum number of merge candidates included in the merge candidate list is two or more. Diagonal partitioning may be allowed only when the maximum number of merge candidates included in the merge candidate list is two or more.

Alternatively, when at least one among the width and the height is greater than 64 in hardware implementation, there is a problem in that a data processing unit of a 64×64 size is redundantly accessed. Accordingly, when at least one among the width and the height of the coding block is greater than a threshold value, partitioning a coding block into a plurality of prediction blocks may not be allowed. For example, when at least one among the width and the height of a coding block is greater than 64 (e.g., when at least one among the width and the height is 128), diagonal partitioning may not be used.

Alternatively, diagonal partitioning may not be allowed for a coding block of which the number of samples is larger than a threshold value, considering the maximum number of samples that can be simultaneously processed in hardware implementation. For example, diagonal partitioning may not be allowed for a coding tree block of which the number of samples is larger than 4,096.

Alternatively, diagonal partitioning may not be allowed for a coding block of which the number of samples included in the coding block is smaller than a threshold value. For example, it may be set not to apply the diagonal partitioning to a coding block when the number of samples included in the coding block is smaller than 64.

Alternatively, whether or not to apply the diagonal partitioning to a coding block may be determined based on whether the width to height ratio of the coding block is lower than a first threshold value or whether the width to height ratio of the coding block is higher than a second threshold value. Here, the width to height ratio whRatio of the coding block may be determined as a ratio of the width CbW to the height CbH of the coding block as shown in Equation 5.

$$whRatio = CbW/CbH \quad \text{[Equation 5]}$$

The second threshold value may be an inverse number of the first threshold value. For example, when the first threshold value is k, the second threshold value may be 1/k.

The diagonal partitioning may be applied to a coding block only when the width to height ratio of the coding block is between the first threshold value and the second threshold value.

Alternatively, triangular partitioning may be used only when the width to height ratio of the coding block is lower than the first threshold value or higher than the second threshold value. For example, when the first threshold value is 16, diagonal partitioning may not be allowed for a coding block of a 64×4 or 4×64 size.

Alternatively, whether or not to allow the diagonal partitioning may be determined based on the partitioning pattern of the parent node. For example, when a parent node coding block is partitioned based on quad-tree partitioning, diagonal partitioning may be applied to a leaf node coding block. On the other hand, it may be set not to allow the diagonal partitioning to the leaf node coding block when the parent node coding block is partitioned based on binary tree or ternary tree partitioning.

Alternatively, whether or not to allow the diagonal partitioning may be determined based on the prediction encoding mode of a coding block. For example, the diagonal partitioning may be allowed only when the coding block is encoded by intra prediction, when the coding block is encoded by inter prediction, or when the coding block is encoded by a predefined inter prediction mode. Here, the predefined inter prediction mode may represent at least one among a merge mode, a motion vector prediction mode, an affine merge mode, and an affine motion vector prediction mode.

Alternatively, whether or not to allow the diagonal partitioning may be determined based on the size of a parallel processing region. For example, when the size of a coding block is larger than the size of a parallel processing region, diagonal partitioning may not be used.

Whether or not to apply the diagonal partitioning to a coding block may be determined considering two or more of the conditions listed above.

As another example, information indicating whether or not to apply the diagonal partitioning to a coding block may be signaled through a bitstream. The information may be signaled at a sequence, picture, slice, or block level. For example, flag triangle_partition_flag indicating whether triangular partitioning is applied to a coding block may be signaled at a coding block level.

When it is determined to apply the diagonal partitioning to a coding block, information indicating the number of lines partitioning the coding block or the positions of the lines may be signaled through a bitstream.

For example, when a coding block is partitioned by a diagonal line, information indicating the direction of the diagonal line partitioning the coding block may be signaled through a bitstream. For example, flag triangle_partition_type_flag indicating the direction of the diagonal line may be signaled through a bitstream. The flag indicates whether the coding block is partitioned by a diagonal line connecting the top-left corner and the bottom-right corner or whether the coding block is partitioned by a diagonal line connecting the top-right corner and the bottom-left corner. Partitioning a coding block by a diagonal line connecting the top-left corner and the bottom-right corner may be referred to as a left triangular partition type, and partitioning a coding block by a diagonal line connecting the top-right corner and the bottom-left corner may be referred to as a right triangular partition type. For example, when the value of the flag is 0, it may indicate that the partition type of the coding block is the left triangular partition type, and when the value of the flag is 1, it may indicate that the partition type of the coding block is the right triangular partition type.

Additionally, information indicating whether the prediction units have the same size or information indicating the position of a diagonal line for partitioning the coding block may be signaled through a bitstream. For example, when the information indicating the sizes of the prediction units indicates that the sizes of the prediction units are the same, encoding of the information indicating the position of the diagonal is omitted, and the coding block may be partitioned into two prediction units using a diagonal line passing through two vertices of the coding block. On the other hand, when the information indicating the sizes of the prediction units indicates that the sizes of the prediction units are not the same, the position of the diagonal line partitioning the coding block may be determined based on the information indicating the position of the diagonal line. For example, when the left triangular partition type is applied to a coding block, the position information may indicate whether the diagonal line is in contact with the left boundary and the bottom boundary or the top boundary and the right boundary of the coding block. Alternatively, when the right triangular partition type is applied to a coding block, the position information may indicate whether the diagonal line is in contact with the right boundary and the bottom boundary or the top boundary and the left boundary of the coding block.

Information indicating the partition type of a coding block may be signaled at a coding block level. Accordingly, the partition type may be determined for each coding block to which the diagonal partitioning is applied.

As another example, information indicating the partition type may be signaled for a sequence, a picture, a slice, a tile, or a coding tree unit. In this case, partition types of coding blocks to which the diagonal partitioning is applied in a sequence, a picture, a slice, a tile, or a coding tree unit may be set to be the same.

Alternatively, information for determining the partition type may be encoded and signaled for the first coding unit to which the diagonal partitioning is applied in the coding tree unit, and the second and subsequent coding units to which the diagonal partitioning is applied may be set to use a partition type the same as that of the first coding unit.

As another example, the partition type of a coding block may be determined based on the partition type of a neighboring block. Here, the neighboring block may include at least one among a neighboring block adjacent to the top-left corner of the coding block, a neighboring block adjacent to the top-right corner, a neighboring block adjacent to the bottom-left corner, a neighboring block positioned on the top, and a neighboring block positioned on the left side. For example, the partition type of the current block may be set to be the same as the partition type of a neighboring block. Alternatively, the partition type of the current block may be determined based on whether the left triangular partition type is applied to the top-left neighboring block or whether the right triangular partition type is applied to the top-right neighboring block or the bottom-left neighboring block.

In order to perform motion prediction compensation on a first triangular prediction unit and a second triangular prediction unit, motion information of each of the first triangular prediction unit and the second triangular prediction unit may be derived. At this point, the motion information of the first triangular prediction unit and the second triangular prediction unit may be derived from merge candidates included in the merge candidate list. To distinguish a general merge candidate list from a merge candidate list used for deriving the motion information of the triangular prediction units, the merge candidate list for deriving the motion information of the triangular prediction units is referred to as a triangular merge candidate list, and a merge candidate included in the triangular merge candidate list will be referred to as a triangular merge candidate. However, using the method of deriving a merge candidate and the method of constructing a merge candidate list described above for the sake of the triangular merge candidates and the method of constructing the triangular merge candidate list is also included in the spirit of the present disclosure.

Information for determining the maximum number of triangular merge candidates that the triangular merge candidate list may include may be signaled through a bitstream. The information may indicate a difference between the maximum number of merge candidates that the merge candidate list may include and the maximum number of triangular merge candidates that the triangular merge candidate list may include.

The triangular merge candidates may be derived from a spatially neighboring block and a temporally neighboring block of a coding block.

Figure 26:
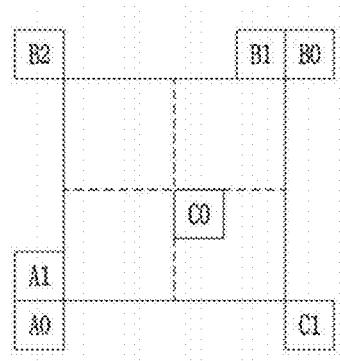
FIG. 26 is a view showing neighboring blocks used for deriving a triangular merge candidate.

FIG. 26 is a view showing neighboring blocks used for deriving a triangular merge candidate.

A triangular merge candidate may be derived using at least one among a neighboring block positioned on the top of a coding block, a neighboring block positioned on the left side of the coding block, and a collocated block included in a picture different from the coding block. The top neighboring block may include at least one among a block including a sample (xCb+CbW−1, yCb−1) positioned on the top of the coding block, a block including a sample (xCb+CbW, yCb−1) positioned on the top of the coding block, and a block including a sample (xCb−1, yCb−1) positioned on the top of the coding block. The left neighboring block may include at least one among a block including a sample (xCb−1, yCb+CbH−1) positioned on the left side of the coding block and a block including a sample (xCb−1, yCb+CbH) positioned on the left side of the coding block. The collocated block may be determined as any one among a block including a sample (xCb+CbW, yCb+CbH) adjacent to the top-right corner of the coding block and a block including a sample (xCb/2, yCb/2) positioned at the center of the coding block, in a collocated picture.

The neighboring blocks may be searched in a predefined order, and triangular merge candidates may be constructed as a triangular merge candidate list according to a predefined order. For example, the triangular merge candidate list may be constructed by searching the triangular merge candidates in the order of B1, A1, B0, A0, C0, B2 and C1.

Motion information of the triangular prediction units may be derived based on the triangular merge candidate list. That is, the triangular prediction units may share one triangular merge candidate list.

In order to derive motion information of the triangular merge unit, information for specifying at least one among the triangular merge candidates included in the triangular merge candidate list may be signaled through a bitstream. For example, index information merge_triangle_idx for specifying at least one among the triangular merge candidates may be signaled through a bitstream.

The index information may specify a combination of a merge candidate of the first triangular prediction unit and a merge candidate of the second triangular prediction unit. For example, Table 1 shows an example of a combination of merge candidates according to index information merge_triangle_idx.

TABLE 1

| merge_triangle_idx | 0 | 1 | 2 | 3 | 4 | 5 | 6 | 7 | 8 | |
|---|---|---|---|---|---|---|---|---|---|---|
| First prediction unit | 1 | 0 | 0 | 0 | 2 | 0 | 0 | 1 | 3 | |
| Second prediction unit | 0 | 1 | 2 | 1 | 0 | 3 | 4 | 0 | 0 | |
| merge_triangle_idx | 9 | 10 | 11 | 12 | 13 | 14 | 15 | 16 | 17 | |
| First prediction unit | 4 | 0 | 1 | 1 | 0 | 0 | 1 | 1 | 1 | |
| Second prediction unit | 0 | 2 | 2 | 2 | 4 | 3 | 3 | 4 | 4 | |
| merge_triangle_idx | 18 | 19 | 20 | 21 | 22 | 23 | 24 | 25 | 26 | 27 | 28 |
| First triangular prediction unit | 1 | 2 | 2 | 2 | 4 | 3 | 3 | 3 | 4 | 3 | 2 |
| Second triangular prediction unit | 3 | 1 | 0 | 1 | 3 | 0 | 2 | 4 | 0 | 1 | 3 |
| merge_triangle_idx | 29 | 30 | 31 | 32 | 33 | 34 | 35 | 36 | 37 | 38 | 39 |
| First triangular prediction unit | 4 | 4 | 2 | 4 | 3 | 4 | 3 | 2 | 2 | 4 | 3 |
| Second triangular prediction unit | 1 | 1 | 3 | 2 | 2 | 3 | 1 | 4 | 4 | 2 | 4 |

When the value of index information merge_triangle_idx is 1, it indicates that the motion information of the first triangular prediction unit is derived from a merge candidate having an index of 1, and the motion information of the second triangular prediction unit is derived from a merge candidate having an index of 0. A triangular merge candidate for deriving motion information of the first triangular prediction unit and a triangular merge candidate for deriving motion information of the second triangular prediction unit may be determined through index information merge_triangle_idx.

A partition type of a coding block to which the diagonal partitioning is applied may be determined based on the index information. That is, the index information may specify a combination of a merge candidate of the first triangular prediction unit, a merge candidate of the second triangular prediction unit, and a partitioning direction of the coding block. When a partition type of the coding block is determined based on the index information, information triangle_partition_type_flag indicating the direction of a diagonal line partitioning the coding block may not be coded. Table 2 expresses partition types of a coding block with respect to index information merge_triangle_idx.

TABLE 2

| merge_triangle_idx | 0 | 1 | 2 | 3 | 4 | 5 | 6 | 7 | 8 | 9 |
|---|---|---|---|---|---|---|---|---|---|---|
| TriangleDir | 0 | 1 | 1 | 0 | 0 | 1 | 1 | 1 | 0 | 0 |
| merge_triangle_idx | 10 | 11 | 12 | 13 | 14 | 15 | 16 | 17 | 18 | 19 |
| TriangleDir | 0 | 0 | 1 | 0 | 0 | 0 | 0 | 1 | 1 | 1 |
| merge_triangle_idx | 20 | 21 | 22 | 23 | 24 | 25 | 26 | 27 | 28 | 29 |
| TriangleDir | 1 | 0 | 0 | 1 | 1 | 1 | 1 | 1 | 1 | 1 |

TABLE 2-continued

| merge_triangle_idx | 30 | 31 | 32 | 33 | 34 | 35 | 36 | 37 | 38 | 39 |
|---|---|---|---|---|---|---|---|---|---|---|
| TriangleDir | 0 | 0 | 1 | 0 | 1 | 0 | 0 | 1 | 0 | 0 |

When variable TriangleDir is 0, it indicates that the left triangle partition type is applied to the coding block, and when variable TriangleDir is 1, it indicates that the right triangle partition type is applied to the coding block. By combining Table 1 and Table 2, it may be set to specify a combination of the merge candidate of the first triangular prediction unit, the merge candidate of the second triangular prediction unit, and the partitioning direction of the coding block by index information merge_triangle_idx.

As another example, index information only for any one among the first triangular prediction unit and the second triangular prediction unit may be signaled, and an index of a triangular merge candidate for the other one among the first triangular prediction unit and the second triangular prediction unit may be determined based on the index information. For example, a triangular merge candidate of the first triangular prediction unit may be determined based on index information merge_triangle_idx indicating an index of any one among the triangular merge candidates. In addition, a triangular merge candidate of the second triangular prediction unit may be specified based on merge_triangle_idx. For example, the triangular merge candidate of the second triangular prediction unit may be derived by adding or subtracting an offset to or from index information merge_triangle_idx. The offset may be an integer such as 1 or 2. For example, a triangular merge candidate having a value obtained by adding 1 to merge_traingle_idx as an index may be determined as the triangular merge candidate of the second triangular prediction unit. When merge_triangle_idx indicates a triangular merge candidate having the largest index value among the triangular merge candidates, motion information of the second triangular prediction unit may be derived from a triangular merge candidate having an index of 0 or a triangular merge candidate having a value obtained by subtracting 1 from merge_triangle_idx as an index.

Alternatively, motion information of the second triangular prediction unit may be derived from a triangular merge candidate having a reference picture the same as that of the triangular merge candidate of the first triangular prediction unit specified by the index information. Here, the triangular merge candidate having a reference picture the same as that of the triangular merge candidate of the first triangular prediction unit may indicate a triangular merge candidate having at least one among L0 reference picture and L1 reference picture the same as those of the triangular merge candidate of the first triangular prediction unit. When there is a plurality of triangular merge candidates having a reference picture the same as that of the triangular merge candidate of the first triangular prediction unit, at least one among the triangular merge candidates may be selected based on whether the merge candidate includes bidirectional motion information or a difference value between the index of the merge candidate and the index information.

As another example, index information may be signaled for each of the first triangular prediction unit and the second triangular prediction unit. For example, first index information 1st_merge_idx for determining a triangular merge candidate of the first triangular prediction unit and second index information 2nd_merge_idx for determining a triangular merge candidate of the second triangular prediction unit may be signaled through a bitstream. The motion information of the first triangular prediction unit may be derived from the triangular merge candidate determined based on first index information 1st_merge_idx, and the motion information of the second triangular prediction unit may be derived from the triangular merge candidate determined based on second index information 2nd_merge_idx.

First index information 1st_merge_idx may indicate an index of any one among the triangular merge candidates included in the triangular merge candidate list. The triangular merge candidate of the first triangular prediction unit may be determined as a triangular merge candidate indicated by first index information 1st_merge_idx.

The triangular merge candidate indicated by first index information 1st_merge_idx may be set not to be used as a triangular merge candidate of the second triangular prediction unit. Accordingly, second index information 2nd_merge_idx of the second triangular prediction unit may indicate an index of any one among the remaining triangular merge candidates excluding the triangular merge candidate indicated by the first index information. When the value of second index information 2nd_merge_idx is smaller than the value of first index information 1st_merge_idx, the triangular merge candidate of the second triangular prediction unit may be determined as a triangular merge candidate having the index information indicated by second index information 2nd_merge_idx. On the other hand, when the value of second index information 2nd_merge_idx is equal to or larger than the value of first index information 1st_merge_idx, the triangular merge candidate of the second triangular prediction unit may be determined as a triangular merge candidate having a value obtained by adding 1 to the value of second index information 2nd_merge_idx as an index.

Alternatively, whether or not to signal the second index information may be determined according to the number of triangular merge candidates included in the triangular merge candidate list. For example, when the maximum number of triangular merge candidates that the triangular merge candidate list may include does not exceed 2, signaling of the second index information may be omitted. When signaling of the second index information is omitted, a second triangular merge candidate may be derived by adding or subtracting an offset to or from the first index information. For example, when the maximum number of triangular merge candidates that the triangular merge candidate list may include is 2 and the first index information indicates index 0, the second triangular merge candidate may be derived by adding 1 to the first index information. Alternatively, when the maximum number of triangular merge candidates that the triangular merge candidate list may include is 2 and the first index information indicates 1, the second triangular merge candidate may be derived by subtracting 1 from the first index information.

Alternatively, when signaling of the second index information is omitted, the second index information may be set to a default value. Here, the default value may be 0. The second triangular merge candidate may be derived by comparing the first index information and the second index information. For example, when the second index information is smaller than the first index information, a merge candidate having index 0 may be set as the second triangular merge candidate, and when the second index information is equal to or greater than the first index information, a merge candidate having index 1 may be set as the second triangular merge candidate.

When the triangular merge candidate has unidirectional motion information, the unidirectional motion information of the triangular merge candidate may be set as motion information of the triangular prediction unit. On the other hand, when the triangular merge candidate has bidirectional motion information, only one among L0 motion information and L1 motion information may be set as motion information of the triangular prediction unit. Which one among L0 motion information and L1 motion information will be taken may be determined based on the index of the triangular merge candidate or motion information of another triangular prediction unit.

For example, when the index of the triangular merge candidate is an even number, L0 motion information of the triangular prediction unit may be set to 0, and L1 motion information of the triangular merge candidate may be set as L1 motion information of the triangular prediction unit. On the other hand, when the index of the triangular merge candidate is an odd number, L1 motion information of the triangular prediction unit may be set to 0, and L0 motion information of the triangular merge candidate may be set to 0. Contrarily, when the index of the triangular merge candidate is an even number, L0 motion information of the triangular merge candidate may be set as L0 motion information of the triangular prediction unit, and when the index of the triangular merge candidate is an odd number, L1 motion information of the triangular merge candidate may be set as L1 motion information of the triangular prediction unit. Alternatively, when the triangular merge candidate is an even number for the first triangular prediction unit, L0 motion information of the triangular merge candidate may be set as L0 motion information of the first triangular prediction unit, whereas when the triangular merge candidate is an odd number for the second triangular prediction unit, L1 motion information of the triangular merge candidate may be set as L1 motion information of the second triangular prediction unit.

Alternatively, when the first triangular prediction unit has L0 motion information, L0 motion information of the second triangular prediction unit may be set to 0, and L1 motion information of the triangular merge candidate may be set as L1 motion information of the second triangular prediction unit. On the other hand, when the first triangular prediction unit has L1 motion information, L1 motion information of the second triangular prediction unit may be set to 0, and L0 motion information of the triangular merge candidate may be set as L0 motion information of the second triangular prediction unit.

A triangular merge candidate list for deriving motion information of the first triangular prediction unit and a triangular merge candidate list for deriving motion information of the second triangular prediction unit may be set differently.

For example, when a triangular merge candidate for deriving motion information of the first triangular prediction unit in the triangular merge candidate list is specified based on the index information for the first triangular prediction unit, motion information of the second triangular prediction unit may be derived using the triangular merge candidate list including the remaining triangular merge candidates excluding the triangular merge candidate indicated by the index information. Specifically, the motion information of the second triangular prediction unit may be derived from any one among the remaining triangular merge candidates.

Accordingly, the maximum number of triangular merge candidates that the triangular merge candidate list of the first triangular prediction unit includes and the maximum number of triangular merge candidates that the triangular merge candidate list of the second triangular prediction unit includes may be different. For example, when the triangular merge candidate list of the first triangular prediction unit includes M merge candidates, the triangular merge candidate list of the second triangular prediction unit may include M−1 merge candidates excluding the triangular merge candidate indicated by the index information of the first triangular prediction unit.

As another example, a merge candidate of each triangular prediction unit is derived based on neighboring blocks adjacent to a coding block, and availability of the neighboring blocks may be determined considering the shape or the position of the triangular prediction unit.

Figures 27, 28:
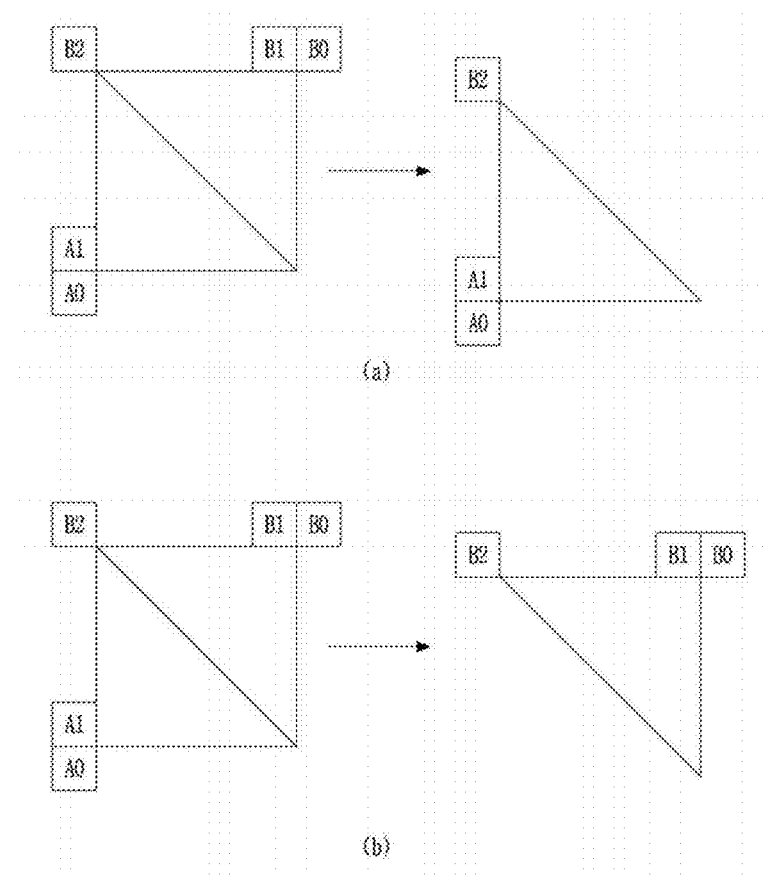
FIG. 27 is a view for describing examples of determining availability of a neighboring block for each triangular prediction unit.
FIG. 28 is a view showing examples of deriving a prediction sample based on a weighted sum operation of a first prediction sample and a second prediction sample.

FIG. 27 is a view for describing examples of determining availability of a neighboring block for each triangular prediction unit.

A neighboring block not adjacent to the first triangular prediction unit may be set as unavailable for the first triangular prediction unit, and a neighboring block not adjacent to the second triangular prediction unit may be set as unavailable for the second triangular prediction unit.

For example, as shown in the example of FIG. 27 (a), when the left triangular partition type is applied to a coding block, it may be determined that blocks A1, A0 and A2 adjacent to the first triangular prediction unit among the neighboring blocks adjacent to the coding block are available for the first triangular prediction unit, whereas blocks B0 and B1 are unavailable for the first triangular prediction unit. Accordingly, the triangular merge candidate list for the first triangular prediction unit may include triangular merge candidates derived from blocks A1, A0 and A2 and may not include triangular merge candidates derived from blocks B0 and B1.

As shown in the example of FIG. 27 (b), when the left triangular partition type is applied to a coding block, it may be determined that blocks B0 and B1 adjacent to the second triangular prediction unit are available for the second triangular prediction unit, whereas blocks A1, A0 and A2 are unavailable for the second triangular prediction unit. Accordingly, the triangular merge candidate list for the second triangular prediction unit may include triangular merge candidates derived from blocks B0 and B1 and may not include triangular merge candidates derived from blocks A1, A0 and A2.

Accordingly, the number of triangular merge candidates or the range of triangular merge candidates that the triangular prediction unit may use may be determined based on at least one among the position of the triangular prediction unit or the partition type of the coding block.

As another example, the merge mode may be applied to only one among the first triangular prediction unit and the second triangular prediction unit. In addition, the motion information of the other one among the first triangular prediction unit and the second triangular prediction unit may be set to be the same as the motion information of the triangular prediction unit to which the merge mode is applied, or may be derived by refining the motion information of the triangular prediction unit to which the merge mode is applied.

For example, a motion vector and a reference picture index of the first triangular prediction unit may be derived based on a triangular merge candidate, and a motion vector of the second triangular prediction unit may be derived by refining the motion vector of the first triangular prediction unit. For example, the motion vector of the second triangular prediction unit may be derived by adding or subtracting a refine motion vector {Rx, Ry} to or from the motion vector {mvD1LXx, mvD1LXy} of the first triangular prediction unit. The reference picture index of the second triangular prediction unit may be set to be the same as the reference picture index of the first triangular prediction unit.

Information for determining a refine motion vector indicating the difference between the motion vector of the first triangular prediction unit and the motion vector of the second triangular prediction unit may be signaled through a bitstream. The information may include at least one among information indicating the size of the refine motion vector and information indicating the sign of the refine motion vector.

Alternatively, the sign of the refine motion vector may be derived based on at least one among the position of the triangular prediction unit, the index of the triangular prediction unit, and the partition type applied to the coding block.

As another example, the motion vector and the reference picture index of any one among the first triangular prediction unit and the second triangular prediction unit may be signaled. The motion vector of the other one among the first triangular prediction unit and the second triangular prediction unit may be derived by refining the signaled motion vector.

For example, the motion vector and the reference picture index of the first triangular prediction unit may be determined based on information signaled from a bitstream. In addition, the motion vector of the second triangular prediction unit may be derived by refining the motion vector of the first triangular prediction unit. For example, the motion vector of the second triangular prediction unit may be derived by adding or subtracting a refine motion vector {Rx, Ry} to or from the motion vector {mvD1LXx, mvD1LXy} of the first triangular prediction unit. The reference picture index of the second triangular prediction unit may be set to be the same as the reference picture index of the first triangular prediction unit.

Motion prediction compensation prediction for each coding block may be performed based on the motion information of the first triangular prediction unit and the motion information of the second triangular prediction unit. At this point, degradation of video quality may occur at the boundary between the first triangular prediction unit and the second triangular prediction unit. For example, continuity of video quality may be degraded in the neighborhood of an edge existing at the boundary between the first triangular prediction unit and the second triangular prediction unit. In order to reduce the degradation of video quality at the boundary, a prediction sample may be derived through a smoothing filter or a weighted prediction.

The prediction samples in a coding block to which diagonal partitioning is applied may be derived based on a weighted sum operation of a first prediction sample obtained based on the motion information of the first triangular prediction unit and a second prediction sample obtained based on the motion information of the second triangular prediction unit. Alternatively, a prediction sample of the first triangular prediction unit is derived from a first prediction block determined based on the motion information of the first triangular prediction unit, and a prediction sample of the second triangular prediction unit is derived from a second prediction block determined based on the motion information of the second triangular prediction unit, and a prediction sample positioned at the boundary region of the first triangular prediction unit and the second triangular prediction unit may be derived based on a weighted sum operation of the first prediction sample included in the first prediction block and the second prediction sample included in the second prediction block. For example, Equation 6 shows an example of deriving prediction samples of the first triangular prediction unit and the second triangular prediction unit.

$$P(x,y)=w1*P1(x,y)+(1-w1)*P2(x,y) \qquad \text{[Equation 6]}$$

In Equation 6, P1 denotes a first prediction sample, and P2 denotes a second prediction sample. wI denotes a weighting value applied to the first prediction sample, and (1−wI) denotes a weighting value applied to the second prediction sample. As shown in the example of Equation 6, the weighting value applied to the second prediction sample may be derived by subtracting the weighting value applied to the first prediction sample from a constant value.

When the left triangular partition type is applied to a coding block, the boundary region may include prediction samples of which the x-axis coordinate and the y-axis coordinate are the same. On the other hand, when the right triangular partition type is applied to a coding block, the boundary region may include prediction samples of which the sum of the x-axis coordinate and the y-axis coordinate is larger than or equal to a first threshold value and smaller than a second threshold value.

A size of the boundary region may be determined based on at least one among the size of the coding block, the shape of the coding block, motion information of the triangular prediction units, a value of difference between the motion vectors of the triangular prediction units, an output order of reference pictures, and a value of difference between the first prediction sample and the second prediction sample at the diagonal boundary.

Figure 29:
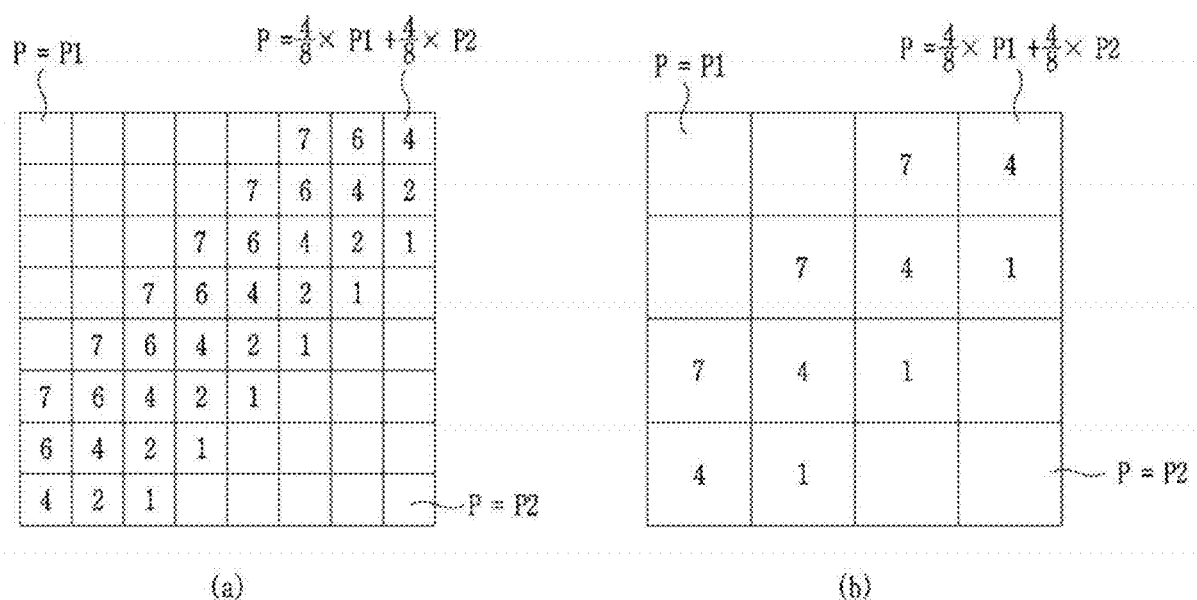
FIG. 29 is a view showing examples of deriving a prediction sample based on a weighted sum operation of a first prediction sample and a second prediction sample.

FIGS. 28 and 29 are views showing examples of deriving a prediction sample based on a weighted sum operation of a first prediction sample and a second prediction sample. FIG. 28 shows an example of applying the left triangular partition type to a coding block, and FIG. 29 shows an example of applying the right triangular partition type to a coding block. In addition, FIGS. 28 (a) and 29 (a) are views showing prediction patterns for a luma component, and FIGS. 28 (b) and 29 (b) are views showing prediction patterns for a chroma component.

In the drawings, the numbers marked on the prediction samples positioned near the boundary between the first prediction unit and the second prediction unit indicate weighting values applied to the first prediction sample. For example, when a number marked on a prediction sample is N, the prediction sample may be derived by applying a weighting value of N/8 to the first prediction sample and applying a weighting value of (1-(N/8)) to the second prediction sample.

In a non-boundary region, the first prediction sample or the second prediction sample may be determined as a prediction sample. Referring to the example of FIG. 28, in a region belonging to the first triangular prediction unit among the regions in which the absolute value of the difference between the x-axis coordinate and the y-axis coordinate is larger than a threshold value, the first prediction sample derived based on the motion information of the first triangular prediction unit may be determined as a prediction sample. On the other hand, in a region belonging to the second triangular prediction unit among the regions in which the value of difference between the x-axis coordinate and the y-axis coordinate is larger than a threshold value, the second prediction sample derived based on the motion information of the second triangular prediction unit may be determined as a prediction sample.

Referring to the example of FIG. 29, in a region in which the sum of the x-axis coordinate and the y-axis coordinate is smaller than a first threshold value, the first prediction sample derived based on the motion information of the first triangular prediction unit may be determined as a prediction sample. On the other hand, in a region in which the sum of the x-axis coordinate and the y-axis coordinate is larger than a second threshold value, the second prediction sample derived based on the motion information of the second triangular prediction unit may be determined as a prediction sample.

A threshold value for determining a non-boundary region may be determined based on at least one among the size of a coding block, the shape of the coding block, and a color component. For example, when the threshold value for a luma component is set to N, the threshold value for a chroma component may be set to N/2.

The prediction samples included in the boundary region may be derived based on a weighted sum operation of the first prediction sample and the second prediction sample. At this point, the weighting values applied to the first prediction sample and the second prediction sample may be determined based on at least one among the position of a prediction sample, the size of a coding block, the shape of the coding block, and a color component.

For example, as shown in the example of FIG. 28 (*a*), prediction samples at the position of the same x-axis coordinate and y-axis coordinate may be derived by applying the same weighting value to the first prediction sample and the second prediction sample. Prediction samples of which the absolute value of the difference between the x-axis coordinate and the y-axis coordinate is 1 may be derived by setting the weighting value ratio applied to the first prediction sample and the second prediction sample to (3:1) or (1:3). In addition, prediction samples of which the absolute value of the difference of the x-axis coordinate and the y-axis coordinate is 2 may be derived by setting the weighting value ratio applied to the first prediction sample and the second prediction sample to (7:1) or (1:7).

Alternatively, as shown in the example of FIG. 28 (*b*), prediction samples at the position of the same x-axis coordinate and y-axis coordinate may be derived by applying the same weighting value to the first prediction sample and the second prediction sample, and prediction samples of which the absolute value of the difference between the x-axis coordinate and the y-axis coordinate is 1 may be derived by setting the weighting value ratio applied to the first prediction sample and the second prediction sample to (7:1) or (1:7).

For example, as shown in the example of FIG. 29 (*a*), prediction samples of which the sum of the x-axis coordinate and the y-axis coordinate is smaller than the width or the height of a coding block by 1 may be derived by applying the same weighting value to the first prediction sample and the second prediction sample. Prediction samples of which the sum of the x-axis coordinate and the y-axis coordinate is equal to or smaller than the width or the height of the coding block by 2 may be derived by setting the weighting value ratio applied to the first prediction sample and the second prediction sample to (3:1) or (1:3). Predicted samples of which the sum of the x-axis coordinates and the y-axis coordinates is greater than or smaller than the width or the height of the coding block by 1 or 3 may be derived by setting the weighting value ratio applied to the first prediction sample and the second prediction sample to (7:1) or (1:7).

Alternatively, as shown in the example of FIG. 29 (*b*), prediction samples of which the sum of the x-axis coordinate and the y-axis coordinate is smaller than the width or the height of the coding block by 1 may be derived by applying the same weighting value to the first prediction sample and the second prediction sample. Prediction samples of which the sum of the x-axis coordinate and the y-axis coordinate is equal to or smaller than the width or the height of the coding block by 2 may be derived by setting the weighting value ratio applied to the first prediction sample and the second prediction sample to (7:1) or (1:7).

As another example, the weighting value may be determined considering the position of a prediction sample or the shape of a coding block. Equations 7 to 9 show an example of deriving a weighting value when the left triangular partition type is applied to a coding block. Equation 7 shows an example of deriving a weighting value applied to the first prediction sample when the coding block is a square shape.

$$w1=(x-y+4)/8 \quad \text{[Equation 7]}$$

In Equation 7, x and y denote the position of a prediction sample. When a coding block is a non-square shape, a weighting value applied to the first prediction sample may be derived as shown in Equation 8 or 9. Equation 8 shows a case where the width of a coding block is greater than the height, and Equation 9 shows a case where the width of a coding block is smaller than the height.

$$w1=((x/\text{whRatio})-y+4)/8 \quad \text{[Equation 8]}$$

$$w1=(x-(y*\text{whRatio})+4)/8 \quad \text{[Equation 9]}$$

When the right triangular partition type is applied to a coding block, a weighting value applied to the first prediction sample may be determined as shown in Equations 10 to 12. Equation 10 shows an example of deriving a weighting value applied to the first prediction sample when the coding block is a square shape.

$$w1=(CbW-1-x-y)+4)/8 \quad \text{[Equation 10]}$$

In Equation 10, CbW denotes the width of a coding block. When the coding block is a non-square shape, the weighting value applied to the first prediction sample may be derived as shown in Equation 11 or Equation 12. Equation 11 shows a case where the width of a coding block is greater than the height, and Equation 12 shows a case where the width of a coding block is smaller than the height.

$$w1=((CbH-1-(x/\text{whRatio})-y)+4)/8 \quad \text{[Equation 11]}$$

$$w1=(CbW-1-x(y*\text{whRatio})+4)/8 \quad \text{[Equation 12]}$$

In Equation 11, CbH denotes the height of the coding block.

As shown in the example, among the prediction samples in the boundary region, prediction samples included in the first triangular prediction unit are derived by assigning a weighting value larger than that of the second prediction sample to the first prediction sample, and prediction samples included in the second triangular prediction unit are derived by assigning a weighting value larger than that of the first prediction sample to the second prediction sample.

When diagonal partitioning is applied to a coding block, it may be set not to apply a combined prediction mode combining the intra prediction mode and the merge mode to the coding block.

Intra prediction is for predicting a current block using reconstructed samples that have been encoded/decoded in the neighborhood of the current block. At this point, samples reconstructed before an in-loop filter is applied may be used for intra prediction of the current block.

The intra prediction technique includes matrix-based intra prediction, and general intra prediction considering directionality with respect to neighboring reconstructed samples. Information indicating the intra prediction technique of the current block may be signaled through a bitstream. The information may be a 1-bit flag. Alternatively, the intra prediction technique of the current block may be determined based on at least one among the position of the current block, the size of the current block, the shape of the current block, and an intra prediction technique of a neighboring block. For example, when the current block exists across a picture boundary, it may be set not to apply the matrix-based intra prediction intra prediction to the current block.

The matrix-based intra prediction intra prediction is a method of acquiring a prediction block of the current block by an encoder and a decoder based on a matrix product between a previously stored matrix and reconstructed samples in the neighborhood of the current block. Information for specifying any one among a plurality of previously stored matrixes may be signaled through a bitstream. The decoder may determine a matrix for intra prediction of the current block based on the information and the size of the current block.

The general intra prediction is a method of acquiring a prediction block for the current block based on a non-angular intra prediction mode or an angular intra prediction mode.

A derived residual picture may be derived by subtracting a prediction video from an original video. At this point, when the residual video is changed to the frequency domain, subjective video quality of the video is not significantly lowered although the high-frequency components among the frequency components are removed. Accordingly, when values of the high-frequency components are converted to be small or the values of the high-frequency components are set to 0, there is an effect of increasing the compression efficiency without generating significant visual distortion. By reflecting this characteristic, the current block may be transformed to decompose a residual video into two-dimensional frequency components. The transform may be performed using a transform technique such as Discrete Cosine Transform (DCT) or Discrete Sine Transform (DST).

The two-dimensional video transform may not be performed for some blocks of the residual video. Not performing the two-dimensional video transform may be referred to as a transform skip. When the transform skip is applied, quantization may be applied to residual coefficients that have not been transformed.

After the current block is transformed using DCT or DST, the transformed current block may be transformed again. At this point, the transform based on DCT or DST may be defined as a first transform, and transforming again a block to which the first transform is applied may be defined as a second transform.

The first transform may be performed using any one among a plurality of transform core candidates. For example, the first transform may be performed using any one among DCT2, DCT8, or DCT7.

Different transform cores may be used for the horizontal direction and the vertical direction. Information indicating combination of a transform core of the horizontal direction and a transform core of the vertical direction may be signaled through a bitstream.

Units for performing the first transform and the second transform may be different. For example, the first transform may be performed on an 8×8 block, and the second transform may be performed on a subblock of a 4×4 size among the transformed 8×8 block. At this point, the transform coefficients of the residual regions that has not been performed the second transform may be set to 0.

Alternatively, the first transform may be performed on a 4×4 block, and the second transform may be performed on a region of an 8×8 size including the transformed 4×4 block.

Information indicating whether or not the second transform has been performed may be signaled through a bitstream.

Alternatively, whether or not to perform the second transform may be determined based on whether the horizontal direction transform core and the vertical direction transform core are the same. For example, the second transform may be performed only when the horizontal direction transform core and the vertical direction transform core are the same. Alternatively, the second transform may be performed only when the horizontal direction transform core and the vertical direction transform core are different from each other.

Alternatively, the second transform may be allowed only when transform of the horizontal direction and transform of the vertical direction use a predefined transform core. For example, when a DCT2 transform core is used for transform of the horizontal direction and transform of the vertical direction, the second transform may be allowed.

Alternatively, whether or not to perform the second transform may be determined based on the number of non-zero transform coefficients of the current block. For example, it may be set not to use the second transform when the number of non-zero transform coefficients of the current block is smaller than or equal to a threshold value, and it may be set to use the second transform when the number of non-zero transform coefficient of the current block is larger than the threshold value. It may be set to use the second transform only when the current block is encoded by intra prediction.

The decoder may perform inverse transform of the second transform (second inverse transform) and may perform inverse transform of the first transform (first inverse transform) on a result of the second inverse transform. As a result of performing the second inverse transform and the first inverse transform, residual signals for the current block may be acquired.

When the encoder performs transform and quantization, the decoder may acquire a residual block through inverse quantization and inverse transform. The decoder may acquire a reconstructed block for the current block by adding a prediction block and the residual block.

When a reconstructed block of the current block is acquired, loss of information occurring in the quantization and encoding process may be reduced through in-loop filtering. An in-loop filter may include at least one among a deblocking filter, a sample adaptive offset filter (SAO), and an adaptive loop filter (ALF).

Applying the embodiments described above focusing on a decoding process or an encoding process to an encoding process or a decoding process is included in the scope of the present disclosure. Changing the embodiments described in a predetermined order in an order different from the described order is also included in the scope of the present disclosure.

Although the embodiments above have been described based on a series of steps or flowcharts, this does not limit the time series order of the present disclosure, and may be performed simultaneously or in a different order as needed. In addition, each of the components (e.g., units, modules, etc.) constituting the block diagram in the embodiments described above may be implemented as a hardware device or software, or a plurality of components may be combined to be implemented as a single hardware device or software. The embodiments described above may be implemented in the form of program commands that can be executed through various computer components and recorded in a computer-readable recording medium. The computer-readable recording medium may include program commands, data files, data structures and the like independently or in combination. The computer-readable recording medium includes, for example, magnetic media such as a hard disk, a floppy disk and a magnetic tape, optical recording media such as a CD-ROM and a DVD, magneto-optical media such as a floptical disk, and hardware devices specially configured to store and execute program commands, such as a ROM, a RAM, a flash memory and the like. The hardware devices described above can be configured to operate using one or more software modules to perform the process of the present disclosure, and vice versa.

The present disclosure can be applied to an electronic device that encodes and decodes a video.

What is claimed is:

1. A video decoding method comprising:
deriving a merge candidate list for a coding block;
deriving first motion information and second motion information by using the merge candidate list; and
obtaining a prediction sample in the coding block based on the first motion information and the second motion information, wherein the first motion information is derived from a first merge candidate in the merge candidate list, the second motion information is derived from a second merge candidate, and the second merge candidate is different from the first merge candidate;
wherein first index information for determining the first merge candidate and second index information for determining the second merge candidate is obtained by decoding from a bitstream, and when a value of the second index information is equal to or greater than a value of the first index information, the value of the second index information is obtained by adding 1 to the value of the second index information.

2. The method according to claim 1, further comprising:
obtaining a first prediction unit and a second prediction unit according to the coding block,
wherein the first motion information corresponds to the first prediction unit, and the second motion information corresponds to the second prediction unit.

3. The method according to claim 2, wherein when at least one among a width and a height of the coding block is greater than a threshold value, the obtaining of the first prediction unit and the second prediction unit according to the coding block is not allowed.

4. The method according to claim 2, wherein a maximum number of merge candidates that the merge candidate list includes is determined based on whether the first prediction unit and the second prediction unit are obtained.

5. The method according to claim 2, wherein obtaining the first prediction unit and the second prediction unit according to the coding block comprises:
applying partitioning to the coding block, to obtain the first prediction unit and the second prediction unit.

6. The method according to claim 2, wherein the first prediction unit is a first triangular prediction unit, and the second prediction unit is a second triangular prediction unit.

7. The method according to claim 6, wherein deriving first motion information and second motion information by using the merge candidate list comprises:
deriving the first motion information for the first triangular prediction unit from a merge candidate, wherein the merge candidate is determined based on the first index information, and
deriving the second motion information for the second triangular prediction unit from another merge candidate, wherein the another merge candidate is determined based on the second index information.

8. A video encoding method comprising:
deriving a merge candidate list for a coding block;
deriving first motion information and second motion information by using the merge candidate list; and
obtaining a prediction sample in the coding block based on the first motion information and the second motion information, wherein the first motion information is derived from a first merge candidate in the merge candidate list, and the second motion information is derived from a second merge candidate, the second merge candidate is different from the first merge candidate;
encoding first index information for determining the first merge candidate and second index information for determining the second merge candidate, wherein when an index of the second merge candidate is equal to or greater than an index of the first merge candidate, the second index information is encoded using a value obtained by adding 1 to the index of the second merge candidate.

9. The method according to claim 8, further comprising:
obtaining a first prediction unit and a second prediction unit according to the coding block,
wherein the first motion information corresponds to the first prediction unit, and the second motion information corresponds to the second prediction unit.

10. The method according to claim 9, wherein when at least one among a width and a height of the coding block is greater than a threshold value, the obtaining of the first prediction unit and the second prediction unit according to the coding block is not allowed.

11. The method according to claim 9, wherein a maximum number of merge candidates that the merge candidate list includes is determined based on whether the first prediction unit and the second prediction unit are obtained.

12. The method according to claim 9, wherein obtaining the first prediction unit and the second prediction unit according to the coding block comprises:
applying partitioning to the coding block, to obtain the first prediction unit and the second prediction unit.

13. The method according to claim 9, wherein the first prediction unit is a first triangular prediction unit, the second prediction unit is a second triangular prediction unit.

14. The method according to claim 13, wherein deriving first motion information and second motion information by using the merge candidate list comprises:
deriving the first motion information for the first triangular prediction unit from a merge candidate, wherein the merge candidate is determined based on the first index information, and
deriving the second motion information for the second triangular prediction unit from another merge candidate, wherein the another merge candidate is determined based on the second index information.

15. A video decoding apparatus comprising an inter prediction part configured to:
derive a merge candidate list for a coding block, derive first motion information and second motion information by using the merge candidate list, and obtain a prediction sample in the coding block based on the first motion information and the second motion information, wherein the first motion information is derived from a first merge candidate in the merge candidate list, the second motion information is derived from a second merge candidate, and the second merge candidate is different from the first merge candidate;

wherein first index information for determining the first merge candidate and second index information for determining the second merge candidate is obtained by decoding from a bitstream; and when a value of the second index information is equal to or greater than a value of the first index information, the value of the second index information is obtained by adding 1 to the value of the second index information.

16. The video decoding apparatus according to claim 15, wherein the inter prediction part is further configured to:
obtain a first prediction unit and a second prediction unit according to the coding block,
wherein the first motion information corresponds to the first prediction unit, and the second motion information corresponds to the second prediction unit.

17. The video decoding apparatus according to claim 16, wherein when at least one among a width and a height of the coding block is greater than a threshold value, the obtaining of the first prediction unit and the second prediction unit according to the coding block is not allowed.

18. The video decoding apparatus according to claim 16, wherein a maximum number of merge candidates that the merge candidate list includes is determined based on whether the first prediction unit and the second prediction unit are obtained.

19. The video decoding apparatus according to claim 16, wherein in order to obtain the first prediction unit and the second prediction unit according to the coding block, the inter prediction part is configured to:
apply partitioning to the coding block, to obtain the first prediction unit and the second prediction unit.

20. The video decoding apparatus according to claim 16, wherein the first prediction unit is a first triangular prediction unit, and the second prediction unit is a second triangular prediction unit.

21. The video decoding apparatus according to claim 20, wherein in order to derive first motion information and second motion information by using the merge candidate list, the inter prediction part is configured to:
derive the first motion information for the first triangular prediction unit from a merge candidate, wherein the merge candidate is determined based on the first index information, and
derive the second motion information for the second triangular prediction unit from the merge candidate, wherein the another merge candidate is determined based on the second index information.

22. A video encoding apparatus, comprising an inter prediction part, configured to:
derive a merge candidate list for a coding block, derive first motion information and second motion information by using the merge candidate list, and obtain a prediction sample in the coding block based on the first motion information and the second motion information, wherein the first motion information is derived from a first merge candidate in the merge candidate list, the second motion information is derived from a second merge candidate, and the second merge candidate is different from the first merge candidate; and encode first index information for determining the first merge candidate and second index information for determining the second merge candidate, wherein when a value of the second index information is equal to or greater than a value of the first index information, the second index information is encoded using a value obtained by adding 1 to the index of the second merge candidate.

23. The video encoding apparatus according to claim 22, wherein the inter prediction part is further configured to:
obtain a first prediction unit and a second prediction unit according to the coding block,
wherein the first motion information corresponds to the first prediction unit, and the second motion information corresponds to the second prediction unit.

24. The video encoding apparatus according to claim 23, wherein when at least one among a width and a height of the coding block is greater than a threshold value, the obtaining of the first prediction unit and the second prediction unit according to the coding block is not allowed.

25. The video encoding apparatus according to claim 23, wherein a maximum number of merge candidates that the merge candidate list includes is determined based on whether the first prediction unit and the second prediction unit are obtained.

26. The video encoding apparatus according to claim 23, wherein in order to obtain the first prediction unit and the second prediction unit according to the coding block, the inter prediction part is configured to:
applying partition to the coding block, to obtain the first prediction unit and the second prediction unit.

27. The video encoding apparatus according to claim 23, wherein the first prediction unit is a first triangular prediction unit, the second prediction unit is a second triangular prediction unit.

28. The video encoding apparatus according to claim 27, wherein in order to derive first motion information and second motion information by using the merge candidate list, the inter prediction part is configured to
derive the first motion information for the first triangular prediction unit from a merge candidate, wherein the merge candidate is determined based on the first index information, and
derive the second motion information for the second triangular prediction unit from another merge candidate, wherein the another merge candidate is determined based on the second index information.

* * * * *